(12) United States Patent
Ducheyne et al.

(10) Patent No.: US 9,163,868 B2
(45) Date of Patent: Oct. 20, 2015

(54) METHODS AND COMPONENTS FOR THERMAL ENERGY STORAGE

(75) Inventors: Wouter Ducheyne, Antwerp (BE); Christian Stevens, Ghent (BE)

(73) Assignees: Technology for Renewable Energy Systems (TFRES) BVBA, Antwerp (BE); Universiteit Gent, Ghent (BE)

( * ) Notice: Subject to any disclaimer, the term of this patent is extended or adjusted under 35 U.S.C. 154(b) by 242 days.

(21) Appl. No.: 13/981,683

(22) PCT Filed: Jan. 24, 2012

(86) PCT No.: PCT/EP2012/051025
§ 371 (c)(1),
(2), (4) Date: Jul. 25, 2013

(87) PCT Pub. No.: WO2012/101110
PCT Pub. Date: Aug. 2, 2012

(65) Prior Publication Data
US 2013/0306268 A1    Nov. 21, 2013

(30) Foreign Application Priority Data

Jan. 26, 2011    (GB) .................................. 1101337.2

(51) Int. Cl.
*F28D 20/00*    (2006.01)
*F25B 30/06*    (2006.01)
*F25D 5/00*    (2006.01)
*C09K 5/18*    (2006.01)

(52) U.S. Cl.
CPC ... *F25D 5/00* (2013.01); *C09K 5/18* (2013.01); *F28D 20/003* (2013.01); *F25B 30/06* (2013.01); *F28D 2020/0026* (2013.01); *Y02E 60/142* (2013.01)

(58) Field of Classification Search
CPC . F28D 20/003; F28D 2020/0026; F25D 5/00; C09K 5/18
See application file for complete search history.

(56) References Cited

U.S. PATENT DOCUMENTS 4,161,210 A  *  7/1979  Reid et al. ................ 165/104.12
4,421,734 A  * 12/1983  Norman .................... 423/658.2
4,532,778 A  *  8/1985  Clark et al. .................... 62/477

(Continued)

FOREIGN PATENT DOCUMENTS

CN    101168481 A    4/2008
DE       3025817 A1    2/1982

(Continued)

OTHER PUBLICATIONS

Kato, "Possibility of Chemical Heat Pump Technologies", Keynote 2—Thermochemical Energy Storage, High Density Thermal Energy Storage Workshop, Jan. 31, 2011.

(Continued)

*Primary Examiner* — Colleen Dunn
(74) *Attorney, Agent, or Firm* — Dinsmore & Shohl LLP

(57) ABSTRACT

A method is provided for storing thermal energy or increasing the thermal energy of a heat pump using reversible chemical reactions in which inorganic oxoacid compounds and/or their salts are hydrolysed and condensed or polymerized in order to release and capture heat.
The method allows thermal energy to be stored at ambient circumstances in a transportable medium and allows converting a continuous heat generation process into a discontinuous and even dislocated consumption.

16 Claims, 13 Drawing Sheets

(56) References Cited

U.S. PATENT DOCUMENTS

| | | | |
|---|---|---|---|
| 6,177,025 B1* | 1/2001 | Ring et al. | 252/69 |
| 2002/0083710 A1* | 7/2002 | Schneider et al. | 60/721 |
| 2007/0218345 A1* | 9/2007 | Sakai et al. | 429/43 |

FOREIGN PATENT DOCUMENTS

| | | |
|---|---|---|
| EP | 1089372 A1 | 4/2001 |
| GB | 1396292 | 6/1975 |
| JP | 56155388 A | 1/1981 |
| JP | 58060198 A | 10/1981 |
| JP | 01161082 A | 6/1989 |

OTHER PUBLICATIONS

Luo et al., "Photo-induced proton gradients and ATP biosynthesis produced by vesicles encapsulated in a silica matrix", Nature Materials, vol. 4, Mar. 2005.

Wang et al., "Review of Recent Patents on Chemical Heat Pump", Recent Patents on Engineering, 2, pp. 208-216, Sep. 19, 2008.

International Search Report for Application No. PCT/EP2012/051025 dated May 29, 2012.

* cited by examiner (1) $R-O_p-(XO_n(OH)_m-O)_y-R' + H_2O \rightarrow R-O_p-((XO_n(OH)_m-O)_{y-1})-H + HOXO_n(OH)_mOR'$ ($\Delta H < 0$)

(2) $R-O_p-(XO_n(OH)_m-O)_y-R' + H_2O \leftarrow R-O_p-((XO_n(OH)_m-O)_{y-1})-H + HOXO_n(OH)_mOR'$ ($\Delta H > 0$)

Where: R, R', p, n, m and y are as defined for the inorganic esters of formula (I)

METHODS AND COMPONENTS FOR THERMAL ENERGY STORAGE

FIELD OF THE INVENTION

This invention relates generally to a method of thermal energy storage or heat pump, i.e. increase the thermal energy from an external heat source, using reversible chemical reactions. Within a reversible cycle, a mixture comprising inorganic oxoacid compounds and/or its salt and water such as e.g. nitrate-, sulfate-phosphate- and sulfonate-esters, are depolymerized by means of an exothermic hydrolysation reaction and polymerized by means of an endothermic condensation reaction in order to release and capture heat. It is accordingly a first aspect of the present invention to provide the use of inorganic oxoacid compounds and/or its salts and water in a method of thermal energy storage and/or in a method to increase the thermal energy from an external heat source, hereinafter also referred to as a heat pump, in particular using inorganic phosphorus oxoacid compounds and/or its salts, such as e.g. polyphosphoric acid.

The invention further provides a method to store thermal energy, said method comprising condensation reaction of a reaction mixture comprising inorganic oxoacid compounds and/or its salts and water using an external heat source. In a further aspect the invention provides a method to release thermal energy from said heat storage comprising an exothermic hydrolysation step of the inorganic oxoacid compounds or its salts.

Using the methods and components of the present invention it is possible to store thermal energy at ambient circumstances in a transportable medium. As a consequence it allows converting a continuous heat generation process into a discontinuous and even dislocated consumption. Moreover it is possible to pump up heat from ambient heat or low temperature heat sources, e.g. 80-200° C., to higher temperature levels with low specific electricity consumption, i.e. to use the method of the present invention as a heat pump.

BACKGROUND TO THE INVENTION

Thermal energy storage is very important in many applications related to the use of waste heat from industrial processes, renewable energies or from different other sources. Moreover heat recuperation is receiving wide spread attention as a means of reducing the demand on fossil fuels and as means of reducing the exhaust of Kyoto gases.

Several heat capturing systems already exist. Heat can be generated from solar or heat sinks, or other sources including sun, geothermal, rest heat or other heat sources.

Examples of heat capturing systems can generally be divided in 3 categories:

I. Sensible heat<500 $MJ/m^3$):
  Water systems
  Thermal oil
II. Latent heat by phase change in materials<1 $MJ/m^3$:
  Materials using there phase change as a means to store or release heat. Example is the use of Na-acetate crystallization. (theoretical heat density 300-800 $GJ/m^3$)
  Using absorption heat of water on silica gel.
III. Reaction heat by reversible chemical reactions <3 $GJ/m^3$:
  Using the mixing heat of sulfuric acid and water.
  Using the reaction heat of hydrogen and metals like Magnesium. (theoretical heat density 3 $GJ/m^3$)
  Salt Hydrates Most of the proposed alternative energy is using the sun or wind as an energy source. Due to the process (chemical cycle) of the present invention, another heat source can be used with more easiness then nowadays: waste heat. Lots of waste heat (also called rest heat) are generated in industry and released into the environment as non usable for further energy utilization, more specific electricity generation, this due to the low exergy state. However the use of rest heat makes sense for instance in residential areas for heating houses or flats and in industrial areas to heat process streams. Instead of using conventional energy sources with high exergy, as e.g. natural gas or other combustibles of others, one could use as well the low exergetic rest heat. It prohibits using high caloric energy sources for low caloric applications. One of the mayor obstructions to use rest heat for these purposes is the fact that rest heat in industry is used continuously versus the discontinuous usage of residential heat and moreover the fact that the heat producing industry is located quite far from residential areas. The energy buffering capacity, the easiness of transport and the possibilities to use this chemical cycle as a heat pump of what is claimed below, forces a breakthrough for the use of rest heat and opens a new way for reducing Kyoto gases. The use of cheap and low $CO_2$ generating transport such as e.g. bulk or container shipments by boat and pipelines form an alternative for intensive $CO_2$ generating road trucks.

In the method described further in this text, heat is used to form polymers of inorganic oxoacid compounds or its salts by a (poly) condensation reaction of inorganic molecules or molecules containing inorganic sub molecules with polyoxoacid compounds or its salts. Proton concentrations, catalysts, membranes etc. are used to promote the synthesis (condensation reaction) and hydrolysis reaction. E.g. mono phosphoric acid and poly phosphoric acids are further polymerized by means of adding heat and by removing water (condensation). The hydrolysis reaction by adding the water again, generates the exothermic depolymerization heat.

Moreover the method and components can be used as a reversible heat pump enabling to generate cold from rest heat, or to increase the thermal energy of a heat sources, with very low electric consumption, typically 1-10%. It accordingly clearly differs from existing heat pump systems such as;

A. Organic Rankine Cyclus (ORC) pumping up heat from low temperature sources to higher temperature levels or using the ORC to produce electricity from rest heat. Typically their realistic thermal efficiency or COP is a heat to power ratio of about 3-5.

B. Using LithiumBromid or water/NH3 and rest heat as a heat pump to produce cold by absorbing heat due to the dissolution of Li—Br in water under vacuum conditions. In U.S. Pat. No. 6,177,02581, and JP01161082 this process is further optimized, with an improved efficiency, by means of a crystallization inhibiting additive C. Enzymatic systems such as for example described in CN101168481A, see whole document and WPI abstract acc. no 2008-H14900 [46] and CAS abstract acc. no. 2008:538691. In this document ATP is used to realize storage and release of high energy. This is done by use of a secretory gland, and consequently differs from the reversible hydrolysation reaction of the present invention.

D. Crystallization processes that release heat with a phase transition to form a solid or solid crystalline form.
  JP 58060198A; Matsushita electric works ltd; Nomura Kazuo; Heat accumulating material. In this patent the a sodium phosphate; Na2HPO4 is used to store heat by means of crystallization or phase transition, by means of specific nucleus agent.
  GB 1396292 A; Randall; 10 Feb. 1971; Improvements in or relating to heat storage units. In this patent the use of a crystallization heat of phosphates is used to store heat.

E. Using dissolution heat such as after bringing after bringing sulfur oxide and sulfuric acid in contact with water or burning heat by bringing S in contact with air, as described in the 2 patents below:

U.S. Pat. No. 4,421,734; Norman Dec. 20, 1983; Sulfuric Acid-sulfur heat storage cycle. In this patent the heat of the dissolution of sulfurdioxyde or highly concentrated sulfuric acid in water, acting as a solvent, to form low concentrated sulfuric acid and the burning of sulfur with oxygen are used to produce heat. To realize heat storage, the highly concentrated sulfuric acid and sulfur need to be stored. This storage enables leveling heat from the sun during longer period.

U.S. Pat. No. 4,532,778; Clark et al Aug. 6, 1985; chemical heat pump and chemical energy storage system. In This US patent the dissolution heat is of sulfuric acid is used to store heat or to realize a heat pump to upgrade the temperature level (or increase the thermal energy) of waste heat.

F. Further systems using dissolution heat, are based on the application of salt hydrates, like e.g. MgC12, Mg(OH)$_2$Ca(OH)$_2$, Sodium carbonate and water, to use the mixing heat of the salts in water.

Recent patents on engineering, 2008, 2,208-216. Review of recent patents on chemical heat pump. Cheng Wang, Peng Zhang and Ruzhu Wang. The thermal potential transformation reversible reaction in chemical heat pump mainly includes liquid-gas absorption, solid-gas reaction and solid adsorption.

Possibility of chemical heat pump technologies by Yukitaka Kato, 31 Jan. 2011, High density thermal energy storage workshop, Arlington, Va., USA. Description of state of the art chemical heat pumps mainly based on the finding that metallic oxides & chloride reactions are till then best available techniques for chemical heat pumps.

G. Other systems to exploit ATP as a molecule with a high energy density, may simply use this compounds as an enhancer for battery or motor performance; e.g.

US20070218345 A; Sakai et al; A fuel cell, electronic device, movable body, power generation system con-generation system.

US20020083710A1; Schneider, Thomas; Molecular motor with use of ATP, actin & myosin to rotate cylinders to produce work.

EP 1089372A1; Camus et al. Sep. 28, 1999; Independent and self-sustainable power generation and storage system. Especially paragraphs 0006 and 0056 and FIG. 7 where ATP is used. In this patent a method for electrical storage is described wherein ATP is used to improve the battery performance.

But do not rely on a reversible hydrolysation reaction as in the present case. Instead ATP synthesis will be driven enzymatically (see CN101168481A above) or by photosynthesis, e.g. Nature materials, 2005, Vol 4(3); Luo et al pp 220-224; Photo induced proton gradients and ATP biosynthesis produced by vesicles encapsulated in a silica matrix.

SUMMARY OF THE INVENTION

As already explained hereinbefore, the present invention is based on the finding that inorganic oxoacid compounds and/or its salts and water can be used in a reversible hydrolysation reaction to store and/or increase the thermal energy of a heat source.

To store the thermal energy, the heat is converted into molecular reaction heat by means of a condensation reaction driven by the removal from water (dehydrolysis) from the reaction medium with the formation of high-energy covalent ester bounds in the inorganic oxoacid compounds and or its salts of the present invention.

To release the thermal energy, such as for example in a method to increase the thermal energy of an heat source, from the high-energy covalent ester bounds, the inorganic oxoacid compounds of the present invention are subjected to a hydrolysation reaction by adding water to the reaction medium comprising said oxoacid compounds or its salts.

Thus in one aspect the present invention provides the use of inorganic oxoacid compounds and its salts and water in a method to store and/or increase the thermal energy from a heat source.

In said use the thermal energy of the heat source is stored by means of a condensation reaction with the removal of water from the reaction solution and the formation of poly inorganic oxoacid compounds and/or its salts.

In said use the thermal energy of the heat source is increased by means of a hydrolysation reaction of inorganic oxoacid compounds and/or its salts, through the addition of water to a reaction solution In other words, the present invention provides the use of inorganic oxoacid compounds and/or its salts and water in a method to store and/or increase the thermal energy from a heat source, characterized in that;

the thermal energy of the heat source is stored by means an condensation reaction with the removal of water from the reaction solution and the formation of poly inorganic oxoacid compounds and/or its salts; and in that the thermal energy of the heat source is increased by means of a hydrolysation reaction inorganic oxoacid compounds and/or its salts, through the addition of water to a reaction solution comprising said inorganic esters.

The inorganic oxoacid compounds and/or its salts in the aforementioned uses or used in the methods of the present invention is an oxoacid of either nitrogen, sulfur or phosphorus or its corresponding salt In an aspect of the present invention the inorganic oxoacid compounds and/or its salts used are represented by general formula (I)

$$R—O_p—((O_nX(OQ)_m-O)_y)—R' \qquad (I)$$

wherein;

Z represents —$(O_nX(OQ)_m-O)_y$—R'';

R represents hydrogen, a hydrocarbon or Z;

R' and R'' are each independently hydrogen, a hydrocarbon or a metal cation, in particular a monovalent metal cation, even more in particular K or Na;

X represents Sulfur (S), Nitrogen (N) or Phosphorus (P); in particular X represents P;

n=1 or 2; m=0 or 1; p=0 or 1;

y=at least 1; in particular 1 to 100; more in particular 1 to 10; even more in particular 1 to 4; alternatively y is 1 to 3; and each Q independently represents a hydrogen, a hydrocarbon or a metal cation, in particular a monovalent metal cation, even more in particular K or Na.

In another aspect of the present invention the inorganic oxoacid compounds and/or its salts used are polyphosphoric acids. It is accordingly an object of the present invention to provide the use of polyphosphoric acids in a method to store and/or increase the thermal energy from a heat source.

In particular the use of polyphosphoric acids in a method to store and/or increase the thermal energy from a heat source, characterized in that;

the thermal energy of the heat source is stored by means of a dehydrolysation reaction (condensation reaction) of phosphoric acids (including mono and poly phosphoric acids); and in that the thermal energy of the heat source is increased by means of a hydrolysation reaction of polyphosphoric acids, through the addition of water to a reaction solution comprising said polyphosphoric acids.

In another aspect of the present invention the inorganic oxoacid compounds and/or its salts used are polyphosphoric acids and/or its salts represented by general formula (Ia)

$$R\text{—}O\text{—}((OP(OQ)_m\text{-}O)_y\text{—}R' \tag{Ia}$$

wherein

R represents hydrogen, a hydrocarbon or a metal cation, in particular a monovalent metal cation, even more in particular K or Na;

R' represents hydrogen, a hydrocarbon or a metal cation, in particular a monovalent metal cation, even more in particular K or Na;

m=0 or 1;

y=at least 1; in particular 1 to 100; more in particular 1 to 10; even more in particular 1 to 4; alternatively y is 1 to 3; and each Q represents a hydrogen, a hydrocarbon or a metal cation, in particular a monovalent metal cation, even more in particular K or Na.

In an even further aspect of the present invention the polyphosphoric acids and/or its salts used are;

pure inorganic linear poly phosphoric acids and/or its salts represented by the following formula: $M_{n+2}P_nO_{(3n+1)}$ (Ib) with n=at least 2; in particular 1 to 10E6; more in particular 2 to 5; M is H+ or a metal cation, in particular a monovalent metal cation, even more in particular K or Na;

pure inorganic cyclic poly phosphoric acids and/or its salts represented by the following formula: $M_nP_nO_{3n}$( Ic) with n=at least 3; in particular 1 to 12; more in particular 3, 4, 5 or 6; M is H+ or a metal cation, in particular a monovalent metal cation, even more in particular K or Na;

pure inorganic branched poly phosphoric acids and/or its, in particular a monovalent metal cation salt, even more in particular K or Na; or combinations thereof.

In a particular aspect of the present invention the polyphosphoric acids and/or its salts used are selected from the group consisting of Phosphoenolpyruvate, Glycerate1,3 bi phosphate, Formyl phosphate, Acetyl phosphate, Propionyl phosphate, Butyryl phosphate or other carboxyl phosphates, Phospho-creatine, Phospho-arginine, Glucose phosphates (1 or 6-phosphate), fructose phosphates, Glycerol-3-phosphate, Nicotine amide adenine dinucleotide phosphate (NADP), dihydroxyacetonephosphate, glyceraldehydephosphates, xylulosephosphate, ribosephosphates, sedoheptulosephosphate, Erythrosephosphate, ribuloseophosphate phosphoserine, Aspartylphosphate and adenosinephosphate.

Based on the forgoing, the present invention further provides a method to store or increase the energy content of a reaction mixture by means of an endothermic condensation reaction, said reaction mixture comprising an inorganic oxoacid compound and/or its salt and water, said reaction being enabled by the heat input from a heat source distinct from said reaction mixture.

The present invention further provides a method, wherein the heat source distinct from said reaction mixture is either rest heat from industrial processes, or heat derived from natural resources such as solar or wind energy. In other words, there is no limitation to the heat source in any one of the uses or methods of the present invention. In principle any heat source can be used, including heat captured or obtained from solar energy, geothermal energy, wind energy, electricity, rest heat from industry and the like.

The present invention further provides a method, wherein water and/or the inorganic oxoacid compound and/or its salt is removed from the reaction mixture.

The present invention further provides a method, further comprising the step of releasing the stored, resp. increased energy content of the reaction mixture in a subsequent process step through the exothermic hydrolysation of the reaction products of said reaction mixture.

The present invention further provides a method, wherein the inorganic oxoacid compound and/or its salt is an oxoacid of either nitrogen, sulfur or phosphorus, or its corresponding salt.

The present invention further provides a method, wherein the inorganic oxoacid compound and/or its salt is represented by general formula (I)

$$R\text{—}O_p\text{—}((O_nX(OQ)_m\text{-}O)_y)\text{—}R' \tag{I}$$

wherein;

R represents hydrogen, a hydrocarbon or Z(as described hereinbelow);

X represents sulfur, nitrogen or phosphorus;

Z represents $\text{—}(O_nX (OQ)_m\text{-}O)_y\text{—}R''$;

R' and R" each independently represent hydrogen, a hydrocarbon or a metal cation;

n=1 or 2; m=0 or 1; p=0 or 1;

y=at least 1; and

Q each independently represent hydrogen, hydrocarbon or a metal cation.

The present invention further provides a method, wherein the inorganic oxoacid compound and/or its salt are polyphosphoric acids and/or their salts, in particular represented by general formula (Ia)

$$R\text{—}O\text{—}((OP(OQ)_m\text{-}O)_y\text{—}R' \tag{Ia}$$

wherein

R and R' each independently represent hydrogen, a hydrocarbon or a metal cation;

m=0 or 1; y=at least 1; and each Q represents hydrogen, hydrocarbon or a metal cation.

The present invention further provides a method, wherein the polyphosphoric acids or their salts are;

a. pure inorganic linear polyphosphoric acids or their salts represented by the following formula: $M_{n+2}P_nO_{(3n+1)})$ (Ib) with n=at least 2; M is H+ or a metal cation;

b. pure inorganic cyclic polyphosphoric acids or their salts represented by the following formula: $M_nP_nO_{3n}$(IC) with n=at least 3; M is H+ or a metal cation;

c. branched; or d. combinations thereof.

The present invention further provides a method, wherein the metal cation is a monovalent metal cation, more in particular K or Na.

The present invention further provides a method, wherein y is within the range of 1 to 100, more in particular within the range of 1 to 10, still more in particular within the range of 1 to 3.

The present invention further provides a method, wherein the salts of phosphoric acids are selected from the group containing Phosphoenolpyruvate, Glycerate1,3 bi phosphate, Formyl phosphate, Acetyl phosphate, Propionyl phosphate, Butyryl phosphate or other carboxyl phosphates, Phosphocreatine, Phospho-arginine, Glucose phosphates (1 or 6-phosphate), fructose phosphates, Glycerol-3-phosphate, Nicotine amide adenine dinucleotide phosphate (NADP), dihydroxyacetonephosphate, glyceraldehydephosphates, xylulosephosphate, ribosephosphates, sedoheptulosephosphate, Erythrosephosphate, ribuloseophosphate phosphoserine, Aspartylphosphate and adenosinephosphate.

The present invention further provides a method, wherein the endothermic condensation reaction is represented by the following formula:

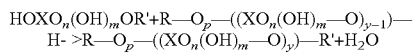
HOXO$_n$(OH)$_m$OR'+R—O$_p$—((XO$_n$(OH)$_m$—O)$_{y-1}$)—H->R—O$_p$—((XO$_n$(OH)$_m$—O)$_y$)—R'+H$_2$O The present invention further provides a system for capturing or storing energy, comprising—capture means for capturing energy;
    storage means for storing captured energy, wherein the capture and storage means comprise at least one reaction vessel at least partially filled with a reaction mixture comprising an inorganic oxoacid compound and/or its salt and water, suitable for having an endothermic condensation reaction performed on said reaction mixture, and comprising a heating element in thermal communication with said vessel.

The present invention further provides a system, further characterized in that it comprises a release means for releasing the energy captured and stored in a subsequent exothermic hydrolysis step.

The present invention further provides a system, further characterized in that the reaction mixture comprises an inorganic oxoacid compound and/or its salt.

As provided in more detail hereinafter, the reaction solution may further comprise conditioning components to optimize the reaction conditions for the esterification/hydrolysation reactions, such as catalysts to catalyze the condensation/hydrolysation reaction.

DESCRIPTION OF THE INVENTION

Figure 1:
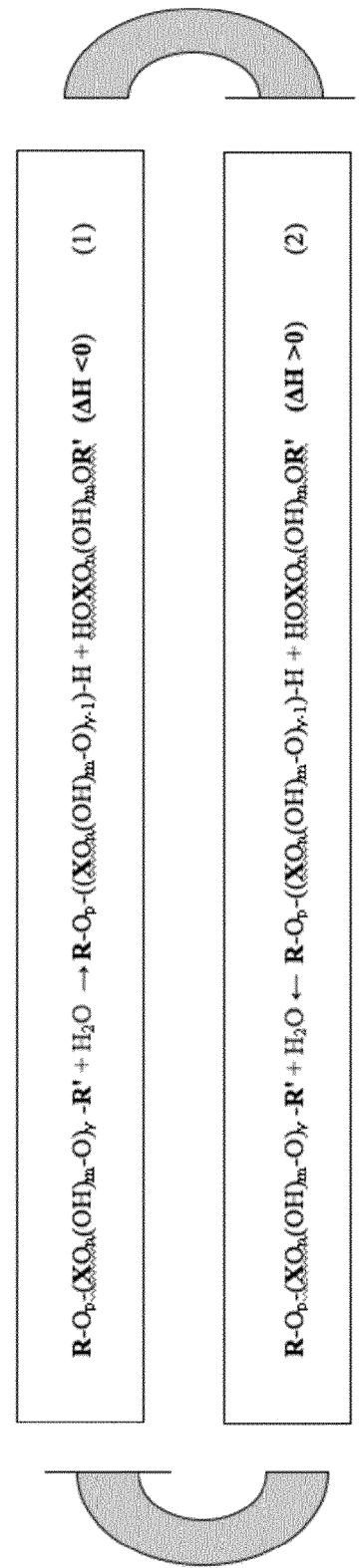
FIG. 1: A. General reaction scheme
B. Block Diagram CHEMENERGY cycle.
Figure 1:
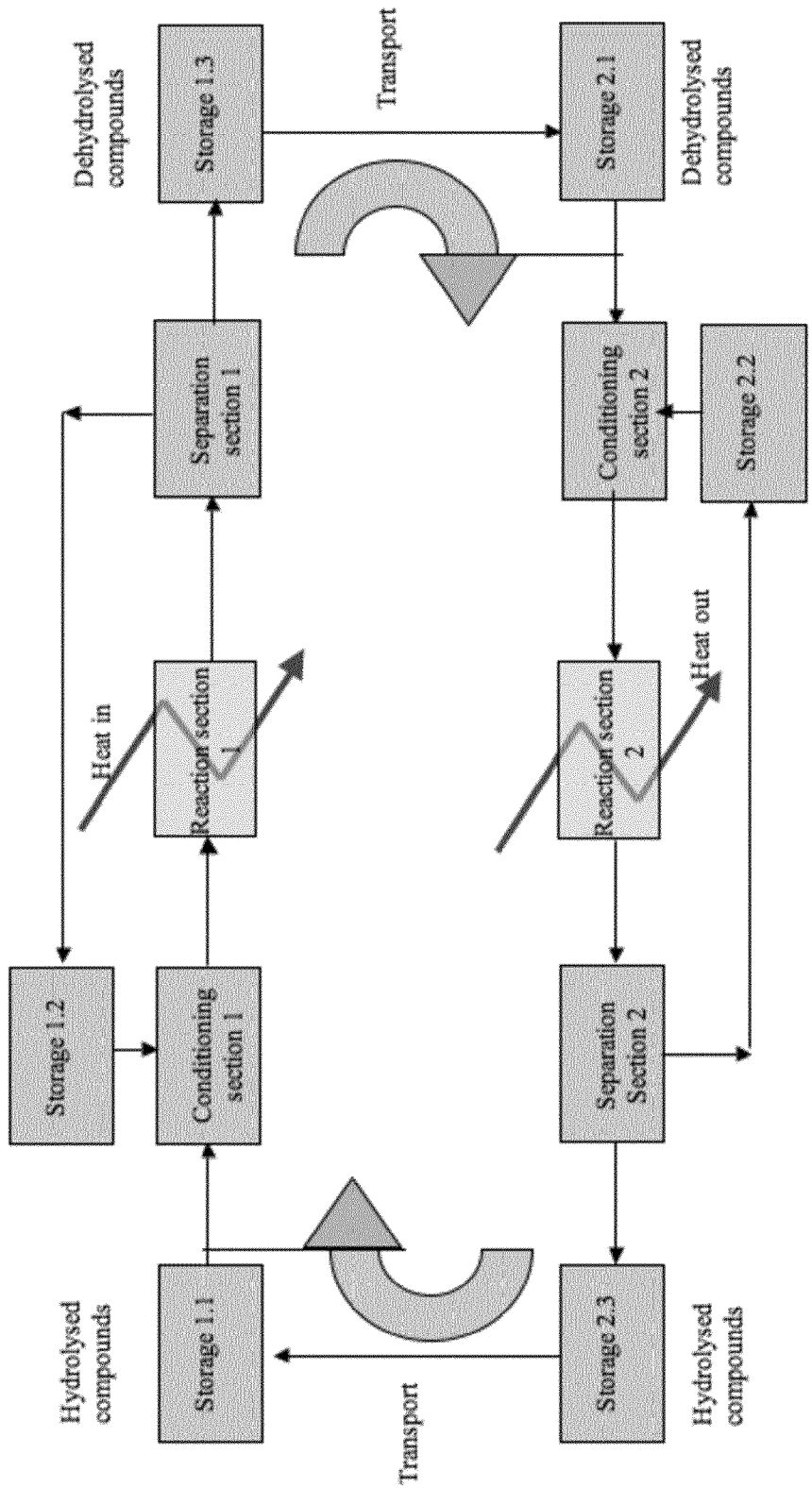

The present invention is based on the findings that inorganic oxoacid compounds and/or its salt, such as e.g. nitrate-, sulfate-, phosphate- and sulfonate-esters, can be used in a method of thermal energy storage, exploiting the reversible chemical hydrolysis and condensation reaction which are exo- and endothermic, respectively.

It is accordingly a first objective of the present invention to provide the use of inorganic oxoacid compounds and/or its salt in a method of thermal energy storage.

The inorganic oxoacid compounds and/or its salt as used herein are selected from the group of inorganic oxoacid compounds and/or its salt with an oxoacid of either nitrogen, sulfur or phosphorus, or its corresponding salt; and in particular the inorganic oxoacid or its salt refer to oxoacids of phosphorus and/or its salt such as phosphorylated hydrocarbons and inorganic (poly)phosphoric acids and its salts.

As is generally known in the art, polymerization refers to the attachment of organic groups (esterification) to phosphorus (P), nitrogen (N), or Sulfur (S) through oxygen linkers, or refers to the polymerization of inorganic oxoacid compounds or their salts of either nitrogen, sulfur or phosphorus, with the generation of H$_2$O or water, by means of an endothermic condensation reaction using an alcoholic precursor of said organic group or a hydroxyl group of said inorganic oxoacids. A general representation of said esterification is provided in step (2) of FIG. 1.

The inorganic oxoacid compound and/or its salt as used in the methods of the present invention, are represented by general formula (I)

$$R—O_p—((O_nX(OQ)_m-O)_y)—R' \qquad (I)$$

wherein
    Z represents —(O$_n$X (OQ)$_m$-O)$_y$—R";
    R represents hydrogen, a hydrocarbon or Z;
    R' and R" are each independently hydrogen, a hydrocarbon or a metal cation, in particular a monovalent metal cation, even more in particular K or Na;
    X represents Sulfur (S), Nitrogen (N) or Phosphorus (P);
    in particular X represents P;
    n=1 or 2; m=0 or 1; p=0 or 1;
    y=at least 1; in particular 1 to 100; more in particular 1 to 10; even more in particular 1 to 4; and
    each Q independently represents a hydrogen, a hydrocarbon or a metal cation; in particular a monovalent metal cation; even more in particular K or Na.

In a particular embodiment of the present invention, the inorganic oxoacid compound and/or its salt are polyphosphoric acids and/or their salts, represented by general formula (Ia)

$$R—O—((OP(OQ)_m-O)_y—R' \qquad (Ia)$$

wherein
    R represents hydrogen, a hydrocarbon or a metal cation, in particular a monovalent metal cation, even more in particular K or Na;
    R' represents hydrogen, a hydrocarbon or a metal cation, in particular a monovalent metal cation, even more in particular K or Na;
    m=0 or 1;
    y=at least 1; in particular 1 to 100; more in particular 1 to 10; even more in particular 1 to 4; and
    each Q represents a hydrogen, a hydrocarbon or a metal cation, in particular a monovalent metal cation, even more in particular K or Na.

The hydrocarbon rest in anyone of the aforementioned formula can be any organic compound comprising a hydroxyl group like for instance alcohols, carboxylic acids, esters etc, or can be any of sugars and bases forming nucleotides and nucleic acids or any organic molecule ending on a hydroxyl group; wherein said hydroxyl group is capable in forming an inorganic ester with a phosphate, polyphosphate, nitrate, sulphate or sulfonic acid. In particular with a phosphate or polyphosphate.

Nucleotides have a well-known meaning in the art and consist of any combination of different nitrogenous bases and different sugars (pentoses) and can have mono, di and tri phosphate(s) as a phosphoryl group:

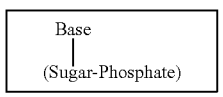

As bases one could for example take Purine, Pyrimidine, Adenine, Guanine, Thymine, Cytosine, Uracil, Hypoxanthine, 5-methylcytosine, N6-methyladenine, dihydrouracil, 1-methylguanine, ribothymidine, pseudouridine, or 1-methyliosine.

As sugars (pentose) one could for example take fructose, ribose, D-ribofuranose, or 2-deoxy-D-ribofuranose.

Nucleic acids have a well-known meaning in the art and can consist out of any combination of different nucleotides. The nucleotides are linked into polynucleotides or nucleic acids through a backbone made of sugars and phosphate groups joined by ester bonds.

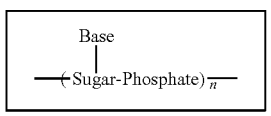

In one embodiment of the present invention the inorganic esters comprise or consist of a 'polyphosphate'. Polyphosphates are anionic phosphate polymers linked between hydroxyl groups and hydrogen atoms. The polymerization that takes place is known as a condensation reaction. Phosphate chemical bonds are typically high-energy covalent bonds, which means that energy is available upon breaking such bonds in spontaneous or enzyme catalyzed reactions. In said embodiment, a particular group of inorganic phosphate esters consist of but is not limited to Phosphoenolpyruvate, Glycerate1,3 bi phosphate, Formyl phosphate, Acetyl phosphate, Propionyl phosphate, Butyryl phosphate or other carboxyl phosphates, Phospho-creatine, Phospho-arginine, Glucose phosphates (1 or 6-phosphate), fructose phosphates, Glycerol-3-phosphate, Nicotine amide adenine dinucleotide phosphate (NADP), dihydroxyacetonephosphate, glyceraldehydephosphates, xylulosephosphate, ribosephosphates, sedoheptulosephosphate, Erythrosephosphate, ribuloseophosphate phospho-serine Aspartylphosphate and adenosinephosphate.

One of the major advantages of these molecules is the fact that they are already available in nature and that the environmental impact is already known. These molecules form, since life is on earth, one of the most important structures to ensure energy storage/supply of all living cells. The fact that these components are used in living cells ensures that they are suitable for mild temperatures, pressure and pH.

These properties makes them adequate for heat processes on ambient circumstances, such as provided in the different embodiments of the present invention.

In another particular embodiment of the present invention, the linear poly phosphoric acids and/or its salts are represented by the following formula:

$$M_{n+2}P_nO_{(3n+1)} \quad (Ib)$$

with
n=at least 2; in particular 1 to 10E6; more in particular 2 to 5;

M is H+ or a metal cation, in particular a monovalent metal cation, even more in particular K or Na.

In another particular embodiment of the present invention, the cyclic poly phosphoric acids and/or its salts are represented by the following formula:

$$M_nP_nO_{3n} \quad (IC)$$

with n=at least 3; in particular 1 to 12; more in particular 3, 4, 5 or 6.

M is H+ or a metal cation, in particular a monovalent metal cation, even more in particular K or Na.

In the methods of the present invention, the reaction products can be a mixture comprising any combination of the products described above.

In the method of thermal energy storage, the reversible chemical hydrolysis and condensation reaction which are exo- and endothermic respectively, are combined with heat capture/storage, heat transportation and heat generation processes to exploit the energy storage/supply capacity of the aforementioned molecules.

Thus in a further embodiment, the present invention provides a method to store thermal energy, said method comprising the condensation reaction as represented in step (2) of FIG. 1, hereinafter also referred to as a polymerization of inorganic oxoacids and/or its salts, using an external heat source.

Any available heat source can be used in the methods of the present invention. Typical heat source include heat captured from sun radiation, and rest heat from industry. Through the polymerization reaction of the inorganic oxoacids and/or its salts, the thermal energy of the heat source is transformed into molecular reaction heat, i.e. into a high-energy covalent bound, as found in the inorganic oxoacids and/or its salts of formulas (I), (Ia), (Ib) and (Ic); also referred to as 'polymerized compounds'.

The high-energy covalent inorganic-oxygen-inorganic linked bounds and in particular the high-energy phosphorus-oxygen-phosphorus bounds, provide storage of thermal energy in a molecular form with an energy density of about 400 kJ/kg—See table 1. In table 1 the solution heat is not incorporated, in case of for instance an inorganic oxoacid or polyphosphoric acid is used, the solution heat comes above the said reaction heats. For example, in case of Polyphosphoric acids, the energy density can go >1 GJ/m³ depending on the degree of polymerization and temperature levels.

In said high-energy molecular form, a previously continuous heat stream can stored/transported at ambient circumstances. It accordingly yields a method to buffer a continuous heat generation process into a discontinuous or dislocated consumption. This can e.g. be implemented to store wind energy on a stormy night with electrical resistance into captured heat and release the heat on morning peak by generating steam or ORC as depicted in application 7 & 9.

TABLE 1

|  | N | kJ/kg | kcal/kg | kcal/mol | gr/mol |
|---|---|---|---|---|---|
| ATP |  | 71 | 16.83 | 8.4 | 499.12 |
| ADP |  | 84 | 19.99 | 8.4 | 420.15 |
| AMP |  | 103 | 24.62 | 8.4 | 341.18 |
| DP |  | 190 | 45.16 | 7.9 | 174.95 |
| Volledige hydrolyse ATP |  | 258 | 61.44 | 30.7 | 499.12 |
| Acetyl phosphate |  | 308 | 73.37 | 11.3 | 154.01 |
| N-Phosphoenolpyruvate | 1 | 377 | 89.69 | 14.8 | 165.02 |
| N Phosphoenolpyruvate | 10 | 412 | 98.09 | 85.9 | 875.75 |

In the aforementioned method of thermal energy storage, 'the polymerized compounds' are optionally removed from the aqueous reaction solution and stored. The aqueous reaction solution used in the methods of the present invention is determined by, amongst others, the nature of the components used to catalyze the transformation, hereinafter also referred to as the transformation components or conditioning components, and known to the skilled artisan. For example; when enzymes are used to catalyze the transformation, the aqueous reaction solution will be an appropriate buffer solution, such as for example the use of a solution with 5 mg/l dephosphorylase extracted from *Escherichia coli*; when living cells are used to catalyze the transformation, an appropriate cell culture medium will be used instead. Living cells used to catalyze the transformation, typically consist of microorganisms such as for example bacteria, e.g. *salmonella, legionella* or *Escherichia coli*, known to absorb heat by dehydrolisation of inorganic phosphate and the to be phosphorilised compounds.

One can use changes in the concentration of the solvent, i.e. change the water concentration in case of an aqueous solution, or of components present in the solvent like for instance but not limited to metallic ions, or of up concentration of the reaction components, like e.g. evaporation in case of an aqueous solution or extracting the water with organic solvents in such a way that first the solvent is evaporated together with the water and secondly condensed, to be separated in a third step from the solvent by for instance gravimetric liquid to liquid phase separation, to influence, drive, catalyze or inhibit the reaction.

Alternatively, changes in the proton concentration can also be used to catalyze the transformation of thermal energy into the aforementioned high-energy covalent bonds. Proton concentration can be influenced by chemicals, e.g. specially designed acids and/or bases, compounds containing sterical acid-base functions, or by use of semi permeable membranes.

Typical examples include for instance HCl as chemical (e.g. commercial available 30-40 wght % in water) to increase proton concentration.

As proton membranes one can take commercial available PEM or "Proton exchange membranes", for instance used in hydrogen fuel cells, including but not limited to, one of the following membranes: Nafion®; Solopor®, Toyota PEM, 3M PEM . . . , and the like.

Removal of the polymerized compounds of the reaction solution can be done in different process steps, including for example a membrane separation step based on the size of the molecules. In said embodiment, the transformation components are preferably much larger than the polymerized compounds and can easily be separated from one another. For example, when enzymes are used to catalyze the transformation, ultra filtration membranes or nano filtration membranes, with a respectively mesh size of about 10-100 nm and 1-10 nm are used. For very large complex structure micro filtration can be used as well (>100 nm). The mesh size of the membranes are depending on the structure and/or the molecular weight of the enzyme. Depending on the used products and reaction circumstances, different types of commercial available membranes can be chosen. See table 2 for different possible examples. Besides the membrane filtration separation technique as described above under nano-, ultra- and micro-filtration, other means to separate the polymerized compounds from the reaction solution are known to the person skilled in the art and include for example separation techniques based on electrical or magnetical properties of for instance large (enzyme) complexes to separate in an electrical/magnetic field, separation techniques based on density by centrifugal forces or by sedimentation, based on percipitation, on phase transition from liquid to solid followed by liquid solid separation, or by adhesing the products to gels, by evaporating water from the reaction solution and many more.

TABLE 2

Commercially available membranes for nano-, ultra- & microfiltration from 2 manufacturers (source www.sterlitech.com)

| Designation | Manufacturer | Polymer | Pore Size | | 25 C. pH |
|---|---|---|---|---|---|
| Nanofiltration (NF) | | | | | |
| CK | GE Osmonics | Cellulose Acetate | 0 | MWCO | 2-8 |
| DK | GE Osmonics | TF (Thin Film) | 0 | MWCO | 2-8 |
| DL | GE Osmonics | TF (Thin Film) | 0 | MWCO | 2-8 |
| HL | GE Osmonics | TF (Thin Film) | 0 | MWCO | 3-9 |
| TFC-SR3 | Koch Membrane | TF (Thin Film) | 200 | MWCO | 4-10 |
| TFC-SR2 | Koch Membrane | Proprietary | 350 | MWCO | 4-9 |
| SelRO MPF -34 | Koch Membrane | Proprietary | 200 | MWCO | 0-14 |
| SelRO MPF-44 | Koch Membrane | Proprietary | 250 | MWCO | 3-10 |
| SelRO MPF-38 | Koch Membrane | Proprietary | 1000 | MWCO | 1-13 |
| Ultrafiltration (UF) | | | | | |
| CQ | GE Osmonics | CA (Cellulose Acetate) | 20000 | MWCO | 2-9 |
| GE | GE Osmonics | Composite polyamide | | | 2-11 |
| GH | GE Osmonics | TF (Thin Film) | 1000 | MWCO | 2-11 |
| GK | GE Osmonics | TF (Thin Film) | 2000 | MWCO | 2-11 |
| GM | GE Osmonics | TF (Thin Film) | 4000 | MWCO | 2-11 |
| ER | GE Osmonics | Polysulfone | 30000 | MWCO | 0.5-13 |
| EW | GE Osmonics | Polysulfone | 60000 | MWCO | 0.5-13 |
| PT | GE Osmonics | PES (Polyethersulfone) | 5000 | MWCO | |
| PW | GE Osmonics | PES (Polyethersulfone) | 20000 | MWCO | 2-11 |
| JW | GE Osmonics | PVDF | 30000 | MWCO | 1-11 |
| MW | GE Osmonics | Ultrafilic | 100000 | MWCO | 1-10 |
| SelRO MPF-U20-S | Koch Membrane | Proprietary | 20000 | MWCO | 3-11 |
| SelRO MPF-U20-T | Koch Membrane | Proprietary | 20000 | MWCO | 0-14 |
| SelRO MPF-U20-P | Koch Membrane | Polyethersulfone | 25000 | MWCO | 0-14 |
| HFK-328 | Koch Membrane | Polysulfone | 5000 | MWCO | 2-10 |
| HFK-131 | Koch Membrane | Polysulfone | 10000 | MWCO | 2-10 |
| HFK-141 | Koch Membrane | Polysulfone | 30000 | MWCO | 2-10 |
| HFM-100 | Koch Membrane | PVDF | 50000 | MWCO | 2-10 |
| HFM-116 | Koch Membrane | PVDF | 50000 | MWCO | 2-10 |

TABLE 2-continued

Commercially available membranes for nano-, ultra- & microfiltration from 2 manufacturers (source www.sterlitech.com)

| Designation | Manufacturer | Polymer | Pore Size | | 25 C. pH |
|---|---|---|---|---|---|
| HFM-180 | Koch Membrane | PVDF | 100000 | MWCO | 2-10 |
| HFM-183 | Koch Membrane | PVDF | 100000 | MWCO | 2-10 |
| HFP-707 | Koch Membrane | PVDF | 120000 | MWCO | 2-10 |
| Microfiltration (MF) | | | | | |
| JX | GE Osmonics | PVDF | 0.3 | micron | 2-11 |
| HFK-618 | Koch Membrane | Polysulfone | 0.1 | micron | 2-10 |

It is accordingly a further object of the present invention to provide the use of 'polymerized compounds' to store/transport thermal energy at ambient temperature. It accordingly yields the use of 'polymerized compounds' in a method to buffer a continuous heat generation process into a discontinuous consumption.

As it is the objective to provide an alternative energy source, i.e. to convert a continuous heat generation process into a discontinuous heat release system, the present invention further provides the means to release heat from the polymerized compounds, said method comprising the hydrolysation reaction as represented in step (1) of FIG. 1, hereinafter also referred to as a hydrolysation of inorganic oxoacids and/or its salts, and using the thermal energy released by said exothermic reaction as a heat source.

As for the polymerization reaction, supra, the reaction conditions for the hydrolysation reaction will be determined by, amongst others, the nature of the components used to catalyze the transformation (transformation components) and are known to the skilled artisan, in other words and as apparent from the examples hereinafter, there is a conditioning of the feed stream (21) to optimize the reaction conditions for the hydrolysation reaction. For example; when enzymes are used to catalyze the transformation, an appropriate buffer solution, such as for example the use of a solution with 5 mg/l phosphorylase extracted from *Escherichia coli* will be used; when living cells are used to catalyze the transformation, an appropriate cell culture medium will be used instead. Living cells used to catalyze the transformation, typically consist of microorganisms such as for example bacteria, e.g. *salmonella, legionella* or *Escherichia coli*. Cells generate heat by hydrolisation of phosphorilised compounds.

One can use changes in the concentration of the solvent, i.e. change the water concentration in case of an aqueous solution, or of components present in the solvent like for instance but not limited to metallic ions, cells, enzymes etc., or of up concentration of the reaction components, like e.g. evaporation in case of an aqueous solution or extracting the water with organic solvents in such a way that first the solvent is evaporated together with the water and secondly condensed, to be separated in a third step from the solvent by for instance gravimetric liquid to liquid phase separation, to influence, drive, catalyze or inhibit the reaction.

Alternatively, chemicals and proton exchange membranes can also be used to catalyze the transformation of thermal energy into the aforementioned high-energy covalent bonds. Proton concentration can be influenced by chemicals or by use of semi permeable membranes.

Typical examples include for instance NaOH as chemical (e.g. commercial available 50 wght % in water) to decrease the proton concentration.

As proton membranes one can take commercial available PEM or "Proton exchange membranes", for instance used in hydrogen fuel cells, including but not limited to, one of the following membranes: Nafion®; Solopor®, Toyota PEM, 3M PEM . . . , and the like.

Again, the hydrolysed compounds are optionally removed from the reaction medium using art known procedures, such as provided for the polymerized compounds above. In said form, the hydrolysed compounds; i.e. comprising the hydroxyl group capable in forming an inorganic poly oxoacid compounds or their salts of either nitrogen, sulfur or phosphorus can be used as source material in the dehydrolysis reaction (supra).

Evidently, systems (installations) using the CHEMENERGY cycle as described herein, are also within the scope of the present application. In a first aspect such systems could be systems for capturing or storing energy, characterized in comprising capture means for capturing energy from a heat source using the polymerization (condensation) reaction as described herein (represented as A in the applications below); and storage means for storing captured energy in the form of the reaction products of said condensation reaction. Said means for capturing heat include at least one reaction vessel for a reaction mixture comprising an inorganic oxoacid compound and/or its salt as described herein and water, suitable for having an endothermic condensation reaction performed on said reaction mixture, and comprising a heating element in thermal communication with said vessel.

In a second aspect, such systems could be systems to release the thermal energy stored in the reaction products of the condensation reaction according to the present invention, characterized in that it comprises a release means for releasing the energy captured and stored in the reaction products of the condensation reaction according to the present invention, by means of an exothermic hydrolysis step (represented as C in the applications below). Said means for releasing the energy include at least one reaction vessel for a reaction mixture comprising an inorganic oxoacid compound and/or its salt as described herein, suitable for having an exothermic hydrolysation reaction and comprising a heating element in thermal communication with said vessel.

In a further aspect, the system includes both means for capturing energy from a heat source using the polymerization (condensation) reaction as described herein (represented as A in the applications below); and means for releasing the energy captured and stored in the reaction products of the condensation reaction according to the present invention, by means of an exothermic hydrolysis step (represented as C in the applications below). Such system having both means (A) and (C) allow that the heat with a low exergy status and used in driving the endothermic condensation reaction (A) is pumped-up to a higher exergy status in the exothermic hydrolysation reaction (C), i.e. in establishing a heat-pump making use of the CHEMENERGY cycle of the present invention.

In a particular embodiment the systems to release the thermal energy from the reaction products of the condensation reaction of the present invention, may further comprise a heat-exchanger (represented as B in the applications below). This heat-exchanger will be used to increase the temperature of the reaction products of the condensation reaction fed into the reaction mixture used in the exothermic hydrolysation reaction (C). Without being limited thereto, temperatures used range from about 60°-500° C.; typically from about 120-500° C., and more in particular from about 150-300° C.

This invention will be better understood by reference to the Experimental Details that follow, but those skilled in the art will readily appreciate that these are only illustrative of the invention as described more fully in the claims that follow thereafter. Additionally, throughout this application, various publications are cited. The disclosure of these publications is hereby incorporated by reference into this application to describe more fully the state of the art to which this invention pertains.

EXAMPLES

Example 1

Phosphate/Polyphosphate Esters

Energy Density

The hydrolysis of a phosphor compound has a reaction energy of approximately 150-500 kJ/kg depending on the reaction conditions. Typically the proposed components have an energy density of 400-1000 MJ/m$^3$. When higher temperature sources like e.g. sun are used, one can e.g. condense (dehydrolyse) phosphoric acid till dry $P_2O_5$ is reached, which has an energy density of about 3000 MJ/m$^3$ Comparing to other heat storing materials, the heat capacity of the polymerized components here claimed is substantially higher. E.g. The phase change reaction of paraffin delivers 20-90 kJ/kg depending on the reaction conditions (copyright@2002 John Wiley & Sons, Ltd.). Solving sulfuric acid in water gives a reaction heat of 300-400 kJ/kg depending on reaction conditions (Chemical and engineering thermodynamics Stanley I. Sandler copyright@1989 John Wiley & Sons, Ltd.). The sole exception being the crystallization of Na-acetate that delivers 400 MJ/m$^3$, but requires a phase transition during the heat conversion.

Products Used

The here-described cycle has its energy derived from chemical energy: CHEMENERGY. It uses molecules that can be phosphorilised, nitrolised or sulfonised or hydrocarbons (PHs) or inorganic (poly)phosphates (IPs), poly phosphoric acids, or inorganic oxoacid compounds and/or their salts of either nitrogen, sulfur 1. Nucleotides: consist out of any combination of different nitrogenuous bases and different sugars (pentoses) and can have mono, di and tri phosphate(s) as a phosphoryl group.
    As bases one could take: Purine, Pyrimidine, Adenine, Guanine, Thymine, Cytosine, Uracil, Hypoxanthine, 5-methylcytosine, N6-methyladenine, dihydrouracil, 1-methylguanine, ribothymidine, pseudouridine, 1-methyliosine . . . .
    As sugars (pentose) one could take fructose, ribose, D-ribofuranose, 2-deoxy-D-ribofuranose, . . .
2. Nucleic acids: they can consist out of any combination of different nucleotides. The nucleotides are linked by phosphate links between 2 bases in the nucleic acids.
3. Most found energy molecules in all living cells: Phosphoenolpyruvate
    Glycerate1,3 bi phosphate, Formyl phosphate, Acetyl phosphate, Propionyl phosphate, Butyryl phosphate or other carboxyl phosphates, Phospho-creatine, Phospho-arginine, Glucose phosphates (1 or 6-phosphate), fructose phosphates, Glycerol-3-phosphate, Nicotine amide adenine dinucleotide phosphate (NADP), dihydroxyacetonephosphate, glyceraldehydephosphates, xylulosephosphate, ribosephosphates, sedoheptulosephosphate, Erythrosephosphate, ribuloseophosphate phospho-serine, Aspartylphosphate, adenosine phosphate
4. Inorganic polyphosphoric acids and their salts
5. Inorganic (poly)nitrates like for instance cellulose, . . . .
6. Inorganic (poly)sulfates and sulfonates It is not the Phosphorilation process or the condensation or polymerization process as such or the esterification process in living cells that is claimed but the condensation and in particular the process of condensation of phosphoric acid and/or polyphosphoric acids and/or their salts in combination with a heat storage, heat pump, transportation and generation processes in industrial applications which is called the "Chemenergy cycle".

All embodiments can be used on a large scale or on very small scale.

Example of a large scale can be a big industrial or residential network of neighborhoods (city) or flats connected to the same heat system getting heat from industrial waste heat buffered with the chemenergy cycle, transported by pipelines and bulk shipments.
  Example of a small scale can be the use within a house/farm with small heat generation capabilities, like e.g. solar system/dunghill/cesspool, and a small Chemenergy skid to improve heat performance.

Figure 2:
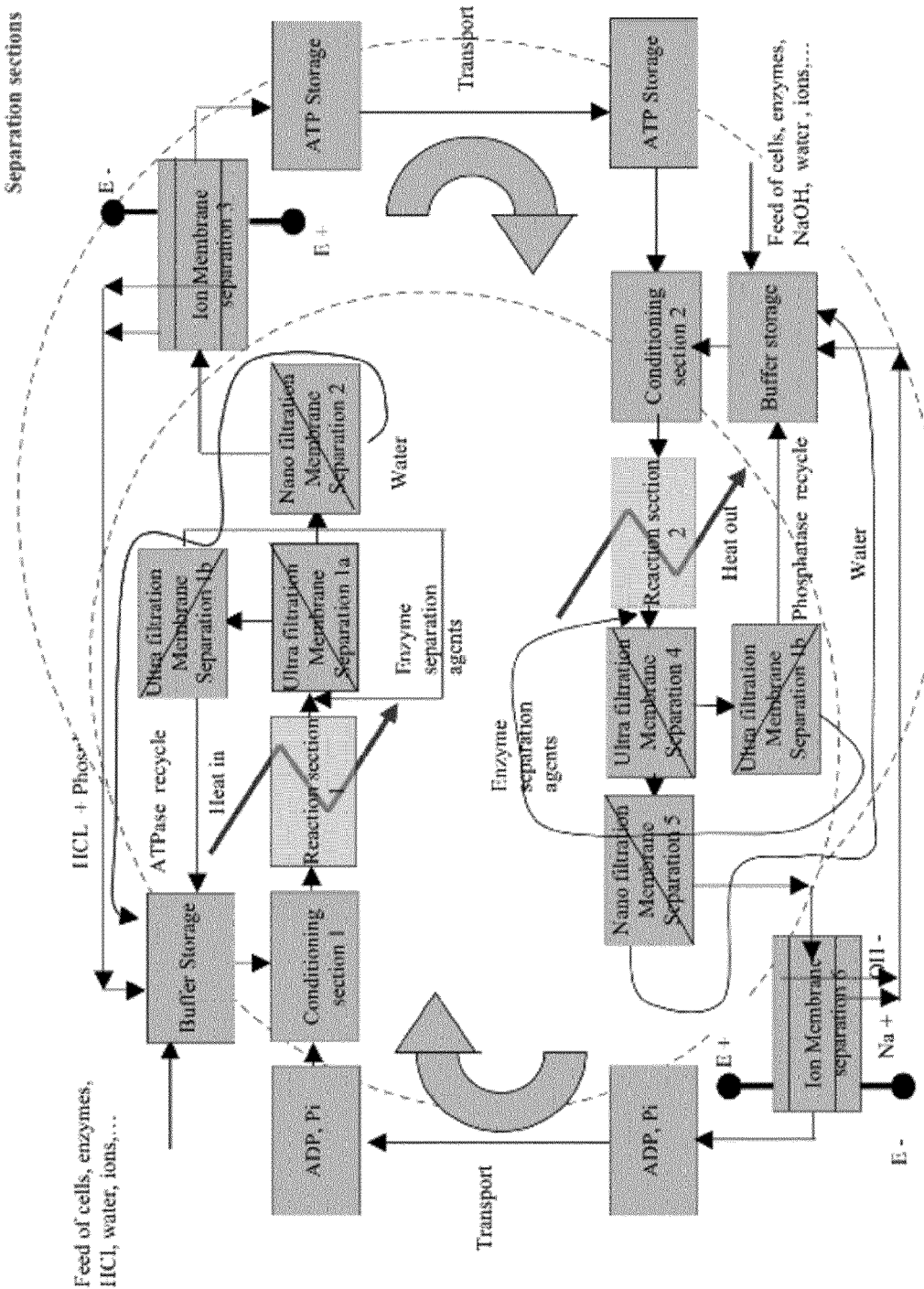
FIG. 2: CHEMENERGY cycle with inorganic phosphate/polyphosphate esters.

The "CHEMENERGY" process general process (FIG. 1)
Heat Storage
  1. Storage 1.1 of hydrolysed components.
  2. Conditioning section 1: adding enzymes, ions, cells, fresh substances.
  3. Storage 1.2 of conditioning products
  4. Reaction section 1: usage of thermal heat to polymerize components by e.g., but not limited to, removing, extracting or evaporating the water from the solution.
  5. Separation section 1: usage of different separation techniques and steps to separate the polymerized components from the conditioning products, waste, enzymes, enzyme separation agents and solvents (or in particular water).
  6. Storage 1.3 of polymerized components.
Heat Release
  1. Storage 2.1 of polymerized components.
  2. Conditioning section 2: adding enzymes, ions, cells, fresh substances, water.
  3. Storage 2.2 of conditioning products
  4. Reaction section 2: usage of heat sink (heat demand) to hydrolyse components by e.g. but not limited to, adding small amounts, e.g. 1-10% of water (conditioning solution) either in the liquid or vapor phase.
  5. Separation section 2: usage of different separation techniques and steps to separate the polymerized components from the conditioning products, waste enzymes, enzyme separation agents and solvents (or in particular water).
  6. Storage 2.3 of hydrolysed components.
The "CHEMENERGY" Process with Phosphorilated Compounds (FIG. 2)

Heat Capturing Loop
1. Storage of feed streams.
2. Conditioning of the feed streams by adding from buffer storage. Important factors to influence reactions are among others pH, ion concentration Ca2+, Mg2+, K, Na, Cl—, Pi, acids, . . . ) enzymes, cells, water, solvents, temperature & many others.
3. Reaction: condensation reaction to form polyphosphoric acid or its salt by absorbing heat by e.g., but not limited to, diminishing the water concentration, such as for example by extracting, removing and/or evaporating the water.
4. Separation of components: separation can be done in different process steps. A particular separation technique is membrane separation, based on the size and or polarity of the molecules. E.g. the larger components cannot pass the membrane, the smaller components can.
    Membrane separation 1a: Ultrafiltration, ATPase (or part of ATPase) and AT(D)P separation agents are separated from rest. (table 2, MWCO<2000, pH<7)
    Membrane separation 1b: Ultrafiltration, separation of ATP separation agents from ATPase or part of this enzyme. (table 2, MWCO<100,000, pH<7)
    Membrane separation 2: Nanofiltration, separation of water. (table 2, MWCO<100, pH<7)
    Membrane separation 3: Ion exchange membrane, separation of ions. (table 2, MWCO<500,000, pH<7)
5. Storage and transport under ambient circumstances.

In some applications, steps 2 & 3 of the above described loop can be done simultaneously e.g. the up concentration and heat absorbing reaction phase using both heat respectively to evaporate the solvent and to polymerize the hydrolyzed components.

Moreover in some applications where water is separated from the solution, steps 3 & 4 are combined in order to drive the reaction towards the polymerized components. The separation technique can be, but not limited to, by evaporating water; or an organic solvent together with small fractions of water and later condensed to be separated from the solvent by gravimetric liquid to liquid extraction.

Heat Releasing Process Loop:
1. Storage of feed streams.
2. Conditioning of the feed streams by adding from buffer storage. Important factors to influence reactions are among others pH, ion concentration Ca2+, Mg2+, K, Na, Cl—, Pi, . . . ) enzymes, cells, water, solvents, temperature & many others.
3. Reaction: Hydrolysis with release of heat by adding water or other hydrolyzing agents, either in the liquid or vapor phase.
4. Separation of components: separation can be done in different process steps. A particular separation technique is membrane separation, based on the size and or polarity of the molecules. E.g. the larger components cannot pass the membrane, the smaller components can.
    Membrane separation 4a: Ultrafiltration, ATPhydrolase (or part of ATPhydrolase) and AD(T)P separation agents are separated from rest. (table 2, MWCO<2000, pH>7)
    Membrane separation 4b: Ultrafiltration, ATPhydrolase (or part of ATPhydrolase) separated from AD(T)P separation agents. (table 2, MWCO<100,000, pH>7)
    Membrane separation 5: Nanofiltration, separation of water. (table 2, MWCO<100, pH>7)
    Membrane separation 6: Ion exchange membrane, separation of ions. (table 2 MWCO<500,000, pH>7)
    Other separation step sequences can be made with same effect.
5. Storage and transport under ambient circumstances.

In some applications, steps 2 & 3 of the above described loop can be done simultaneously e.g. the conditioning of e.g. the pH could be necessary to maintain the reaction going. In case the second hydrolyzing component is water a separation of the components will not be necessary.

Further Details to FIG. 2 can be in Particular:
1. At following temperatures cycle was operated:
    1.1. Temperatures reaction 1 product in: 20° C. (ambient storage).
    1.2. Temperatures reaction 1 heat input>50° C. and preferable >70° C.: in particular >80°-100° C.; more in particular >140° C.: coming from available industrial waste heat.
    1.3. Temperatures reaction 2 product in: at least 20° C. (ambient storage or higher temperatures).
    1.4. Temperatures reaction 2 heat output>40° C.: served for a central heating system.
2. Reaction 1 concentration at pH< or >7+ions in water at 80° C. and water concentration e.g. <30% and preferable <10%; in particular <15% and more in particular <5-10% or lower.
3. Reaction 2 concentration at pH> or <7+ions in water at 90° C. and water concentration e.g. >30% Not all sub-components as AMP, Pyrophosphate, ions etc are shown here.
4. As ATP and ADP all other kinds phosphates or polyphosphates of the in this invention described components can be used as well; in particular the phosphorylated hydrocarbons, inorganic oxoacids of phosphorus or more specific polyphosphoric acids and/or their salts.
5. Not all interconnection flows are shown but the principle shown connections are enough to show functionality for a skilled artisan 16. Pumps, Valves, piping and other standard processing equipment specifications not indicated.
7. Pressures depending on pressure drop over membranes and piping pressure drops. To be engineered depending on size and geometry.
8. Equipment materials to be chosen with attention for the medium circumstances (mainly pH driven). Hastelloy or duplex equipment & piping materials are suited for here described application. Other materials (carbon steel, stainless steel or other alloys), resisting the medium circumstances, to be taken in function of material prices and desired life time.

Feed Stocks and Raw Materials.

Raw materials for this process can be produced in different ways. One could extract the components from biomass or out of available chemicals and available chemicals reaction routes.

Many of the used materials have routes being filed by e.g. pharmaceutical companies using the PHs for testing medicaments in vitro on ATP or other nucleotides. These processes are mainly for a small scale production and e.g. unit wise heat cycle application.

There are also materials that can be created from combining commercially available chemicals like for instance Acetic acid and Phosphoric acid to produce acetylphosphate. These feed stocks can be used for large scale heat cycles Use of commercially available (poly)phosphoric acid, preferably chemically pure quality, typically 700-85% $H_3PO_4$.

Specific for this cycle is the use of Phosporilated hydrocarbons or inorganic (poly)phosphoric acids and/or their salts.

pH Regulation

In the Chemenergy cycle, conditioning of the feed streams for both the Heat Storage and Heat Release part, includes pH regulation. Any known method to regulate the pH in a feed stream can be used, and include for example the application of a "proton exchange membrane" (PEM), such as for example the commercial available Nafion®; Solopor®, the Toyota PEM or 3M PEM. Said membranes unidirectional and selectively transport protons to the cathode (negative side) of the membrane. Alternatively, the pH is regulated using specific acids/bases complexes or chemicals as pH regulator, and include for example the application of HCL or NaOH.

Example 2

Laboratory Testing of the CHEMENERGY Process at Different Starting Conditions 2.1. Starting with the Heat Releasing Process Loop at Ambient Temperature
1. Mix water and Polyphosphoric acid at 20° C. and ambient pressure. Based on the heat balance detailed below, temperature will raise to about 95° C., agitate the mixture.
2. Establish vacuum above the warm mixture, keep the mixture warm with electrical resistance and remove the evaporated water with an air condenser. Duration of this evaporation (separation) step will be dependent on the amount of water to be removed, but is likely to last for about 1 hour.
3. Cool the polyphosphate mixture with ambient air to 25° C. Go back to step 1 and the loop is closed.

Calculation of Change in Temperature (Delta T):

If the mass % of the mixture is 90% polyphosphoric acid mixed up with 10% water, a reaction heat of 300 kJ/kg and an overall average mixture heat capacity (Cp) of 1.5 kJ/kgK, the Delta T, can be calculated from a simple heat balance as follows;

Reaction Heat=(Mass)×(*Cp*)×(Delta *T*).

Hence, Delta T=(Reaction Heat)/[(Cp)×(Mass)]

Using the aforementioned Reaction Heat, Cp and Mass, the change in temperature/kg will be 75° C. In other words the mixture will rise from 25° C. to something less then 100° C.

2.1.1. Conclusion for the CHEMENERGY Process when Starting at Ambient Temperature Notwithstanding the fact that in this case the reaction loop is closed, thermodynamically it doesn't make sense due to the fact the heat generated in step 1, is counterbalanced by the energy required to evaporate water from the mixture in step 2. For said reasons, and as explained herein, the CHEMENERGY process of the present invention is particularly useful in combination with an external heat source, such as for example waste heat from industrial processes. Under said circumstances and as explained in 2.3. below, the heat releasing process loop can start at for example industrial rest heat level, e.g. between 50° C.-200° C. and more specific between 80-150° C. but can also start from higher temperatures, like e.g. 300° C., if desired.

2.2. Starting with the Heat Releasing Process Loop at Industrial Rest Heat Temperature With this experiment it was the objective to pump up heat of one temperature level to a higher level. The temperature level of step one in test 1 was 90° C., this is the average temperature level which is called in industry waste heat, namely between 60-120° C. E.g. the oil cooling level of diesel motor is about 90° C. Steps 1-4 were tested times after each other to prove cyclicity and/or reversibility.

1. Mix water and Polyphosphates at 90° C. under a pressure of 6 bar. In analogy with 2.1 above a Delta T of 75° C. was to be expected and temperature did rise to about 165° C. while agitating the mixture continuously.
2. The mixture was cooled with ambient air to about 90° C. This is to be compared with the release towards a process.
3. Pressure above the warm mixture was released till water evaporated, whilst keeping the mixture warm with water of 90° C. and removing the evaporated water with an air condenser. Duration of this evaporation (separation) step will be dependent on the amount of water to be removed, but lasted for about 1 hour.
4. The mixture was pressurized up to 6 bar, and the evaporated water are reused in step 1, closing the loop of the CHEMENERGY process. Temperature lift was about 30-50° C.

2.2.1. Conclusion for the CHEMENERGY Process when Starting at Rest Heat Temperature In this second case, since rest heat is used for the evaporation step, only a limited amount of additional energy is required to pressurize the mixture. Consequently, part of the rest heat with a low exergy status (at 90° C.) is pumped-up to a higher exergy status of about 165° C. In this laboratory set up, the experiment only served to pump up warm water of 90° C. into hot air of 165° C. But one can imagine that if we use other fluida, and/or heat sources, the present cycle allows the creation of heat pumps to generate or valorize rest heat towards useful energy and/or heat. E.g. The CHEMENERGY process of the present invention could be used to drive chemical reactions in a chemical plant at 120-130° C. that are now driven by high temperature steam of e.g. 6-10 bar, using rest steam of 1-2 bar instead.

It is thus the combination of the temperature lift, caused by the hydrolysis reaction of the inorganic oxo acids and/or their salts, in particular inorganic polyphosphoric acids and/or their salts, with the presence of a heat/energy source that can give rise to much higher temperature lifts, e.g. >200° C., thus resulting in an overall increase of thermal energy. As will become apparent from the following exemplary applications of the CHEMENERGY cycle in different environments, the heat source is on the one hand used to remove water (20) from the reaction product (14) of the hydrolysation reaction (C), i.e. in other words to drive the polymerization condensation) reaction (A); and on the other hand to increase the thermal energy of the condensed polymerized) components (10) used in the hydrolysation reaction (C).

In the below list of possible applications, as an example, liquid phosphoric acid (14) was used as a monomer to be polymerized (condensation reaction (A)) towards a liquid mixture of polyphosphoric acids (10) of general formula Ib and Ic above (polymer lengths are generally >1, and typically from about 2-7), through the removal of water (20) under influence of the heat/energy source. The water obtained from this polymerization (condensation reaction) can be (re)used in the reverse reaction, i.e. the hydrolysation reaction, eventually after conditioning with conditioning components (21) or blown into the atmosphere. Depending on the energy source the polymerization reaction is run under vacuum, near vacuum or small overpressure. For heat sources starting at about 140° C. a small overpressure is desired, typically 0.1-0.5 barg, but sometimes higher in function of specific operational demands. For heat sources up to about 80° C. under pressure is desired, typically >0.025 bar or lower. For heat sources between and about 80° C. to 140° C., pressure varies from a slight under pressure±0.025 bar to more or less 1 atm. Evidently, from the foregoing and as part of the CHEMENERGY cycle, the polymerization reaction is performed at lower temperatures ranging from about 80-200° C., but typically from 90-120° C.

In the reverse reaction, i.e. the hydrolysation reaction (C), said liquid mixture of polyphosphoric acids (10) is used as polymer hydrolysed (adding of water) under pressure towards the phosphoric acid (14) and some rests of polyphosphoric acids in an exothermic reaction with the release of heat elevating the initial rest heat to a higher energy level. Again, the phosphoric acid can be (re)used as feed stream in the aforementioned condensation reaction (A), thus closing the CHEMENERGY cycle according to the present invention. In the hydrolysation reaction, the water may be added as warm water, either in liquid or vapor form. When in vapor form, this gives an extra boost to the hydrolysis reaction due to the extra added condensation heat when mixing the vapor with the polyphosphoric acids. In principle the hydrolysation reaction can be run at ambient temperatures, but when used as temperature lift (heat pump) to increase the thermal energy of a source, it is run at higher temperatures like e.g. but not limited to 60°-500° C.; typically from 120-500° C., and more in particular from about 150-300° C. In said instance, and as already explained hereinbefore, the heat/energy source will also be used to increase the thermal energy of the condensed (polymerized) components (10) used in the hydrolysation reaction (C).

Evidently, the core in the aforementioned CHEMENERGY process is the reversibility of the hydrolysation reaction of Polyphosphoric acids versus phosphoric acids. Thus in principle the phosphoric acids can be used in a closed cycle, but since some irreversible side reactions might occur, some spill (waste) and new feed of phosphoric acids might be needed to keep performance optimal. Consequently, phosphoric acid concentrations are fairly stable throughout the cycle with concentrations ranging from about 80-90%; in particular from about 84-94% after hydrolysis and from about 90-100%; in particular from about 94-100% before hydrolysis.

Figure 3:
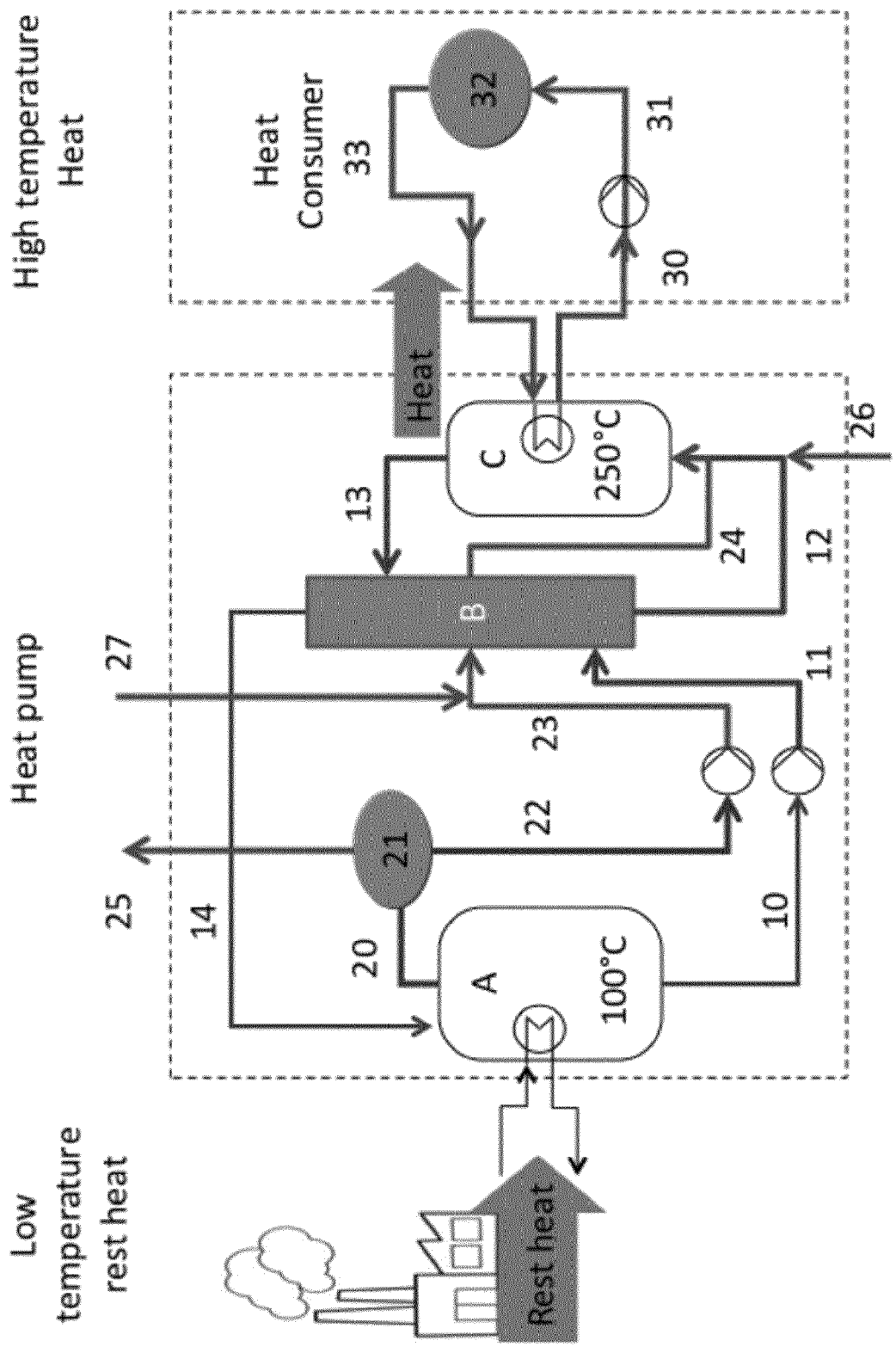
FIGS. 3-11: Different possible applications for the CHEMENERGY cycle in increasing the thermal energy of a heat source. Details on the elements in the flow diagrams for each of the applications can be found in Table 3 below.
Figure 4:
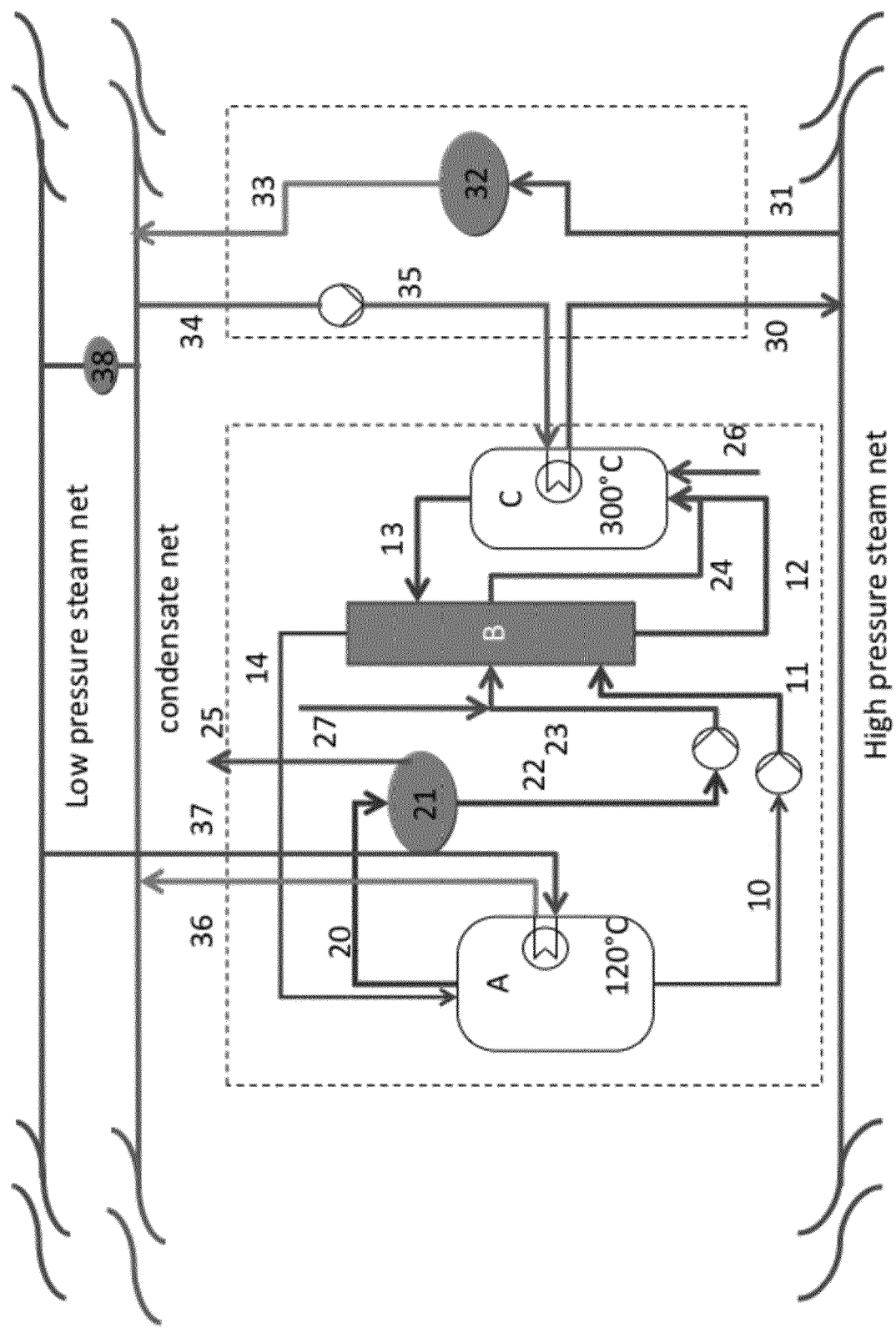
Figure 5:
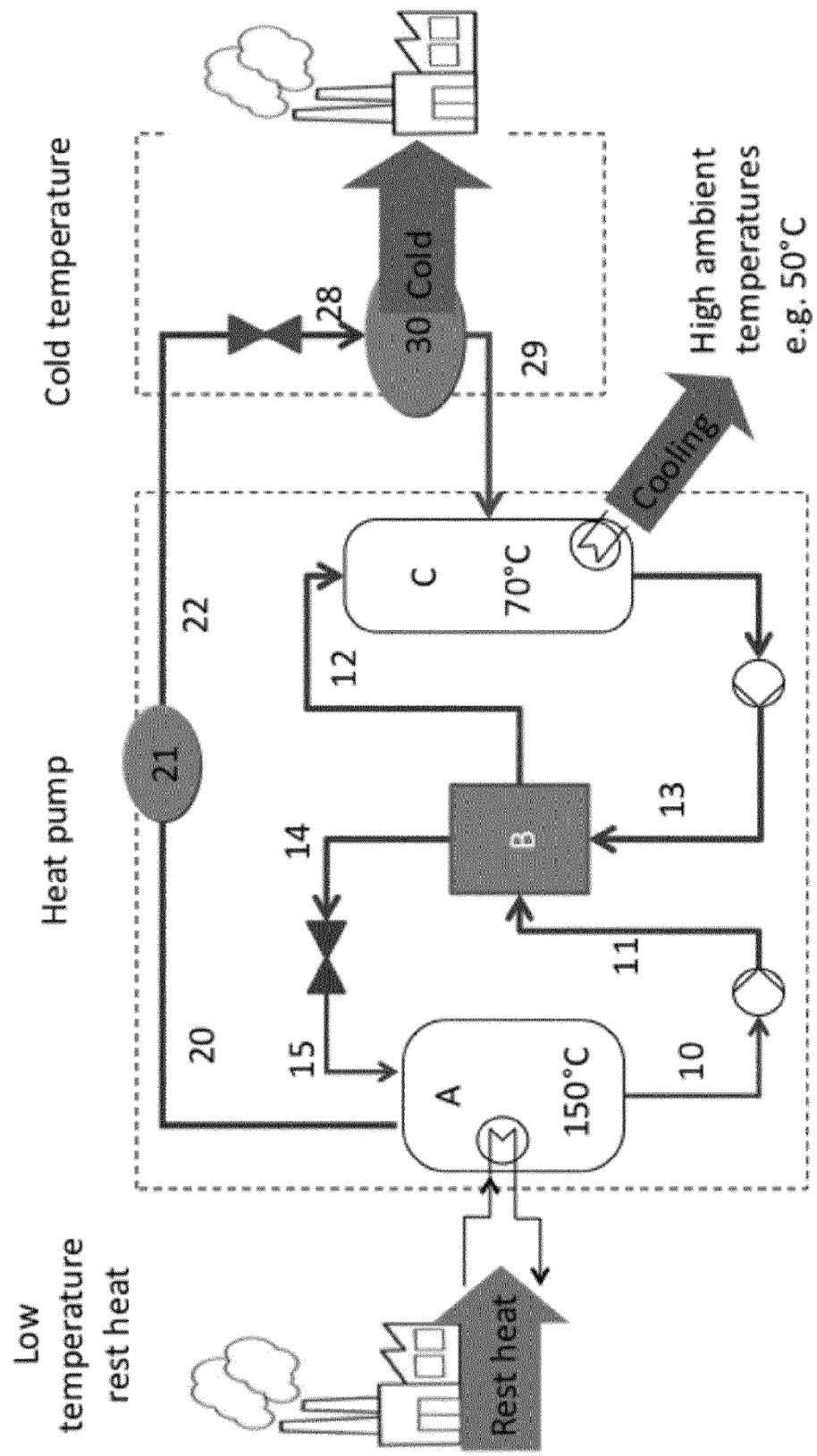
Figure 6:
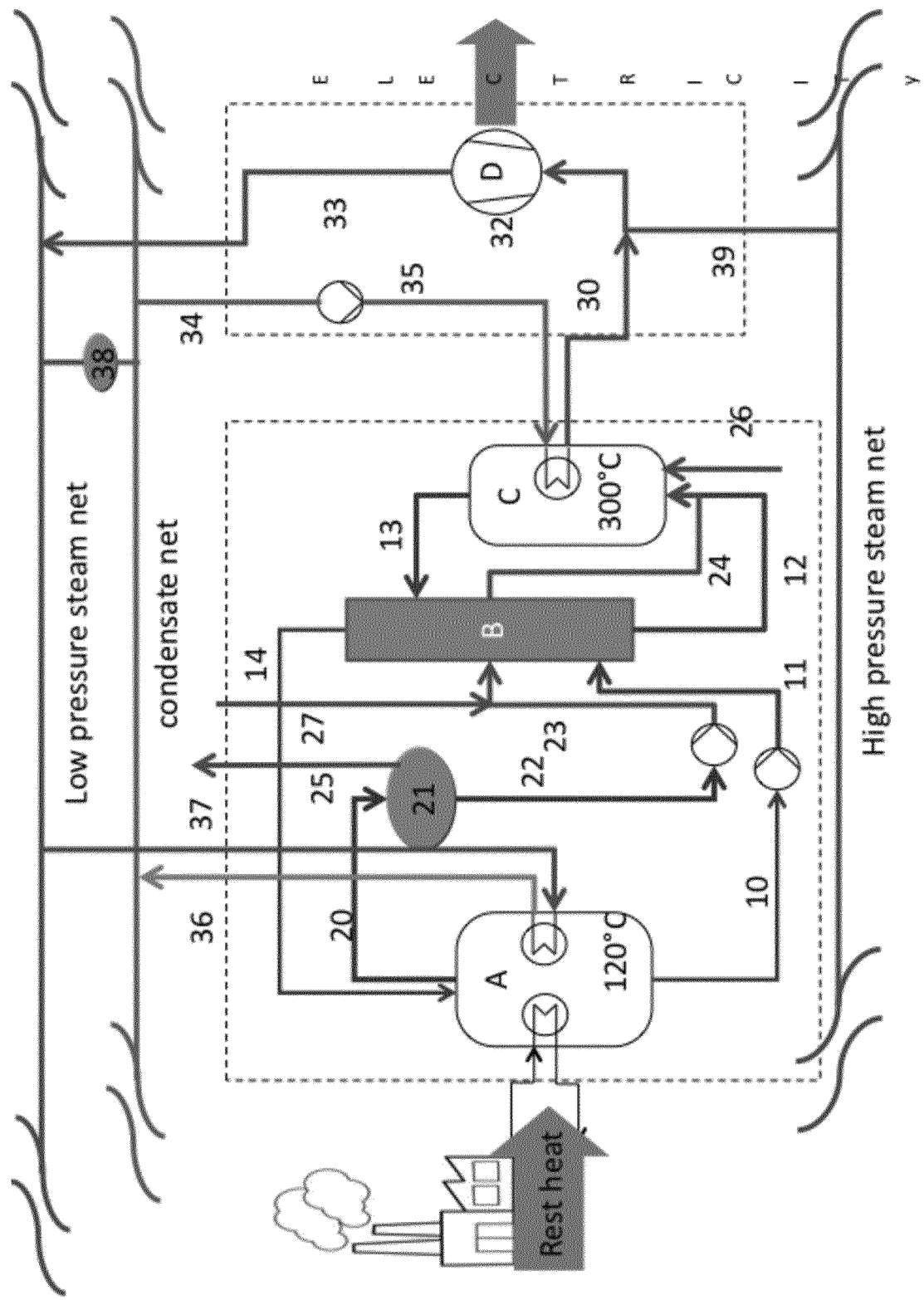
Figure 7:
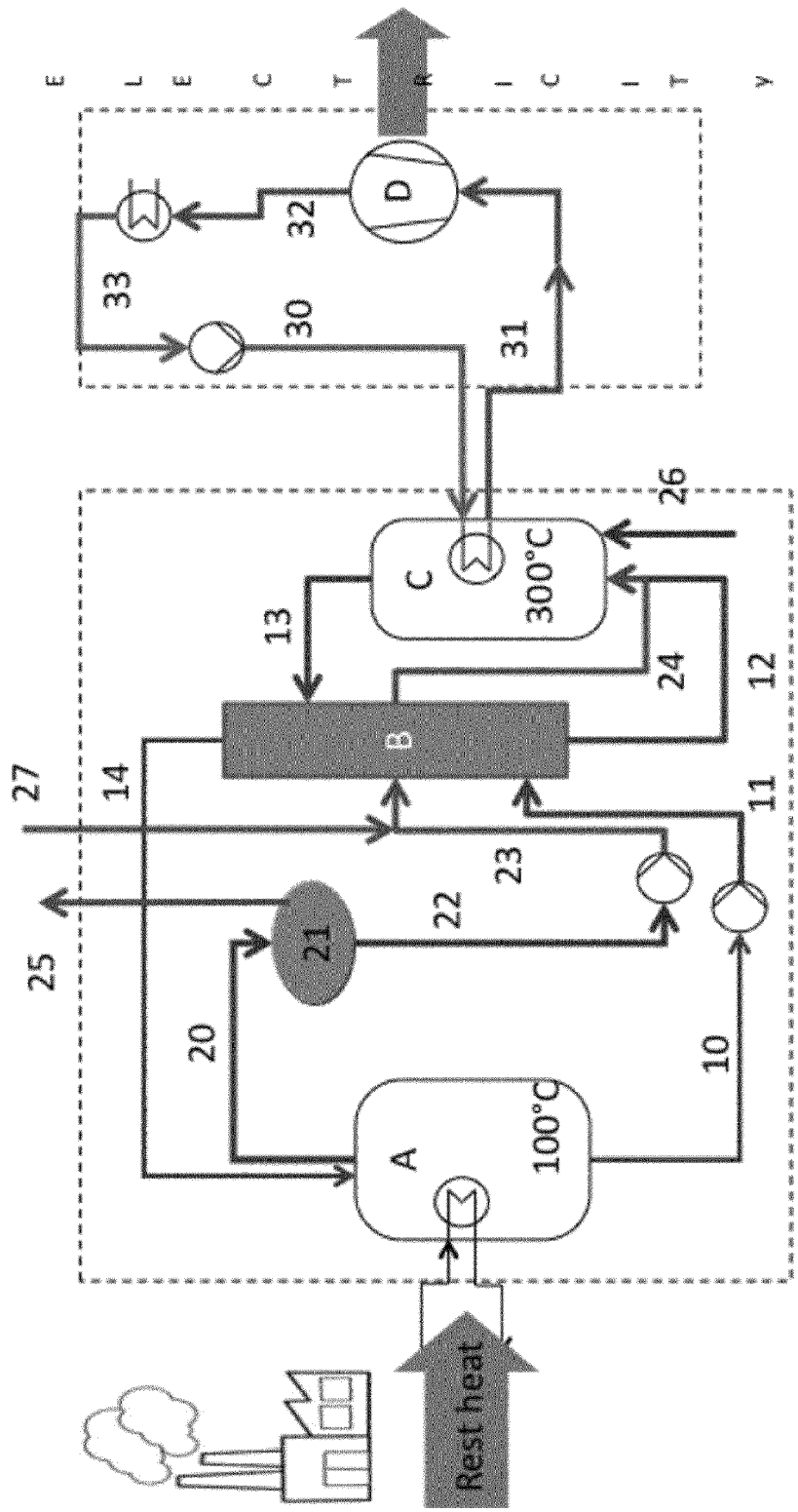
Figure 8:
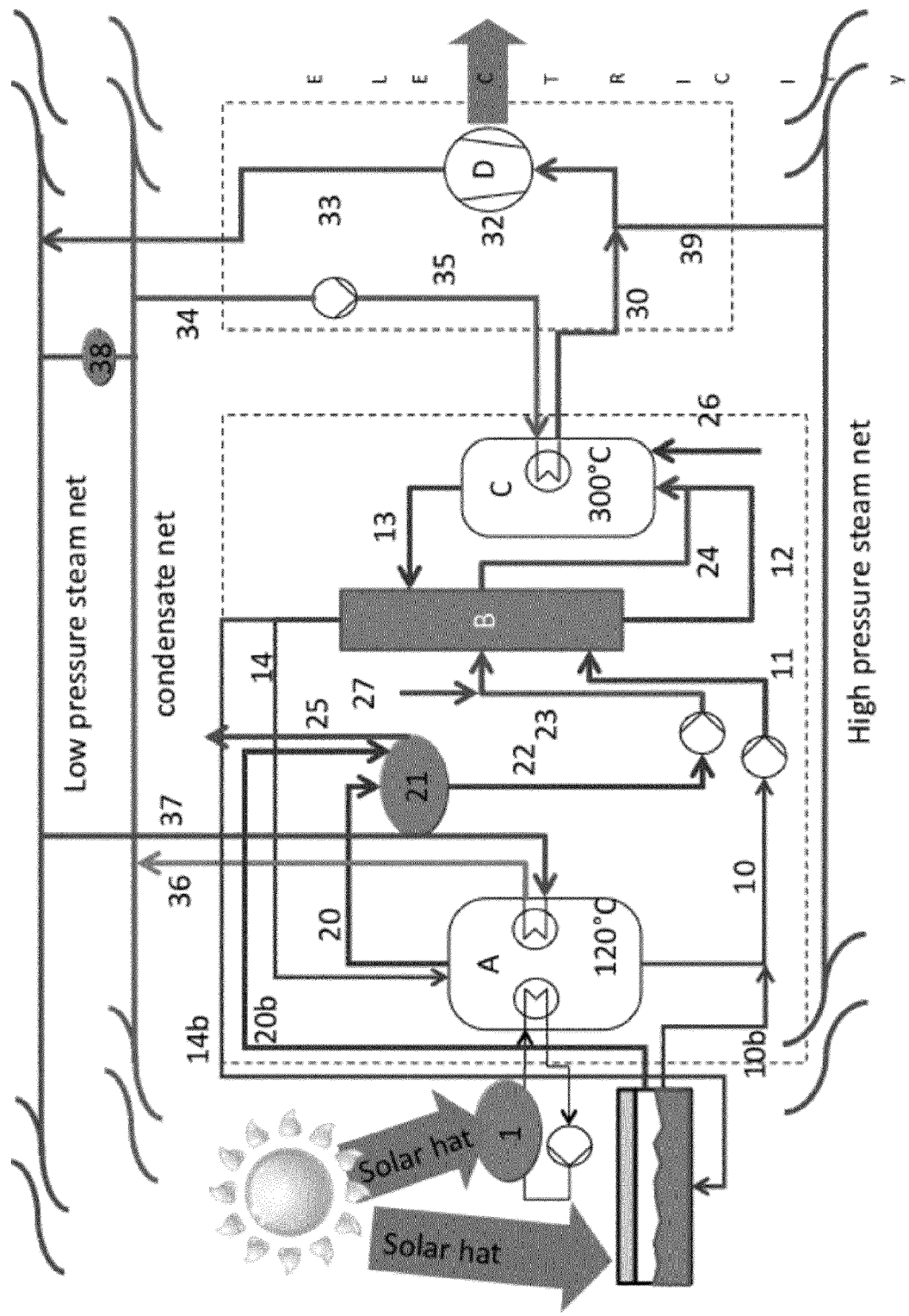

Depending on the application, the cycle is either continuous (continuous flow of the feed streams between the reactions (A) and (C)), e.g.;

Application 1 (FIG. 3): heat pump to valorize rest heat, in heating/cooling from processes, warehouses, residential areas, supermarkets, etc, using rest heat from another process, environment, sun, wind, and the like, Application 2 (FIG. 4): heat pump between heat networks, to increase the thermal energy from one heat fluidum temperature/pressure level like e.g. steam, water, thermal oil, . . . to a higher temperature/pressure level of a heat fluidum like e.g. steam, water, thermal oil, . . . , Application 5 (FIG. 5): use of heat pump technology to generate cold with e.g. high ambient temperatures, for Cooling of industrial processes, warehouses, supermarkets, refrigerators, houses, residential areas etc. with rest heat from processes, environment, sun, wind, combined heat power, neighborhood or others, Application 6 (FIG. 6): transforming rest heat from processes, sun, wind, combined heat power, etc. via a heat pump for steam generation to expand steam over a turbine in the generation of electricity, Application 7 (FIG. 7): pumping up rest heat from processes, sun, wind, combined heat power, etc . . . and transforming with an 'Organic Ranking Cycle' (ORC) turbine towards electricity, Application 8 (FIG. 8): transforming solar heat towards electricity, using more or less the same scheme as for Application 7, only differing in that solar heat is used as heat source instead. In this particular application, the solar heat can be used to fully dehydrolyse some (14b) or all of the liquid phosphoric acid (14) in the polymerization (condensation) reaction, yielding pure (solid) or almost pure (slurry) $P_2O_5$. In this case a very high energy density is reached (up to 3 $GJ/m^3$) and the system must be designed to handle this material. This can e.g. be done by heating up a non flowing phosphoric acid in a container (insulated containment) constantly heated by direct or indirect sunlight and water vapor escapes from the phosphoric acid till only a dry powder or slurry of solid P2O5 is left.

Figure 9:
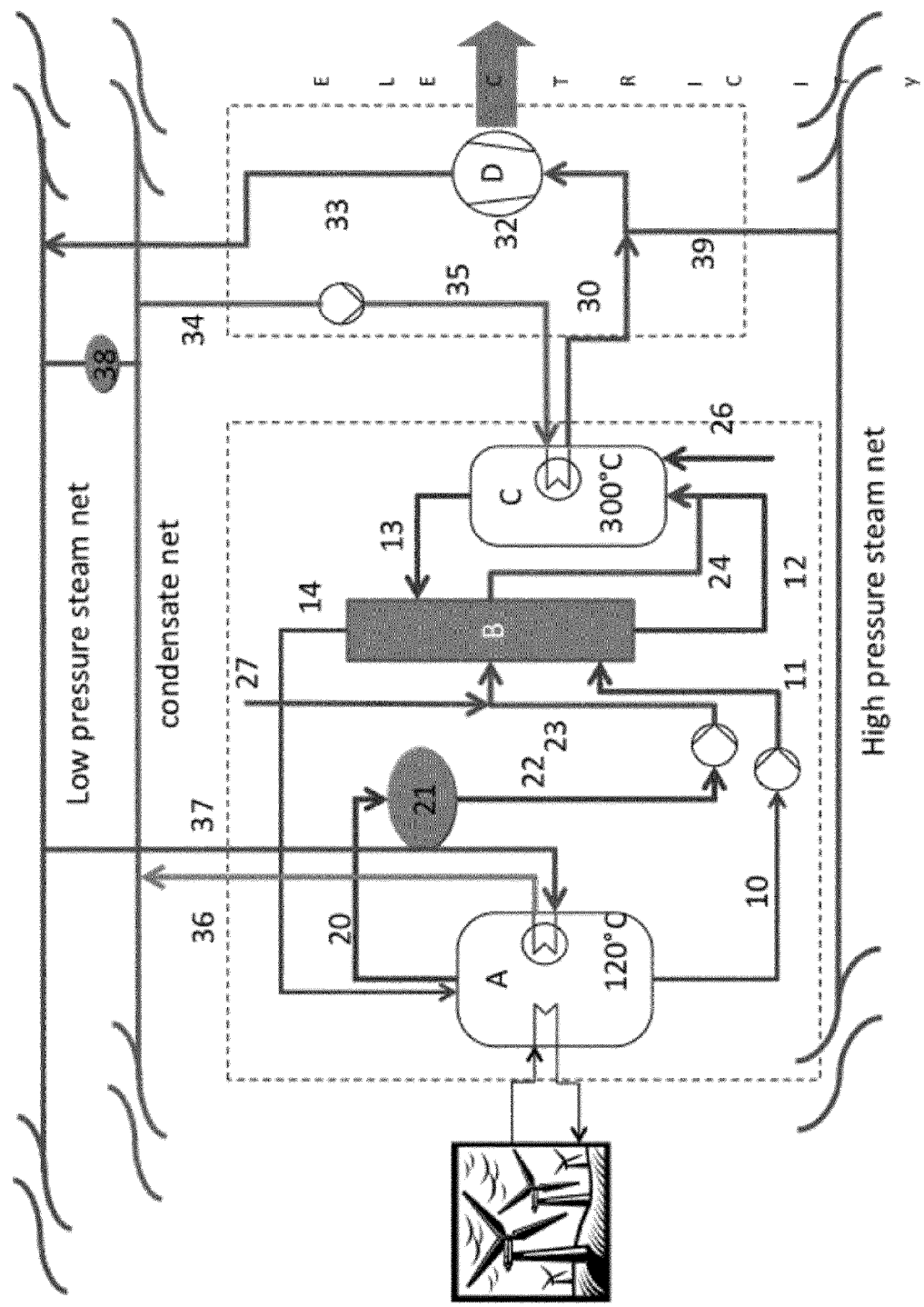

Application 9 (FIG. 9): in buffering wind powered electricity. In this application the heat is generated by electric resistance, this heat is used via a heat pump for steam generation to expand steam over a turbine and generating electricity. It can be used for buffering electricity generated by wind during dips in the electricity network and save it for later during peaks in the electricity network;

discontinuous, e.g.

Figure 10:
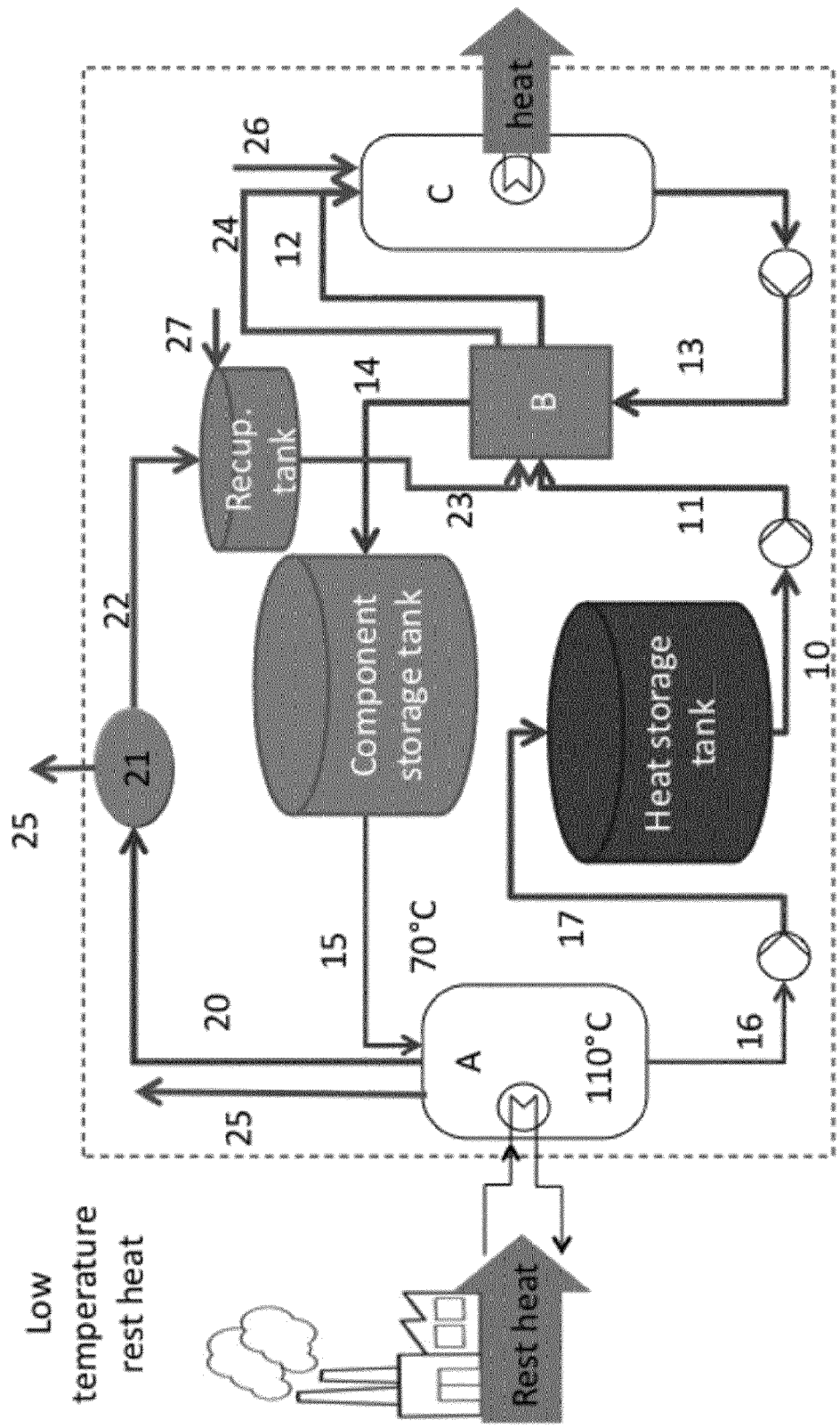
Figure 11:
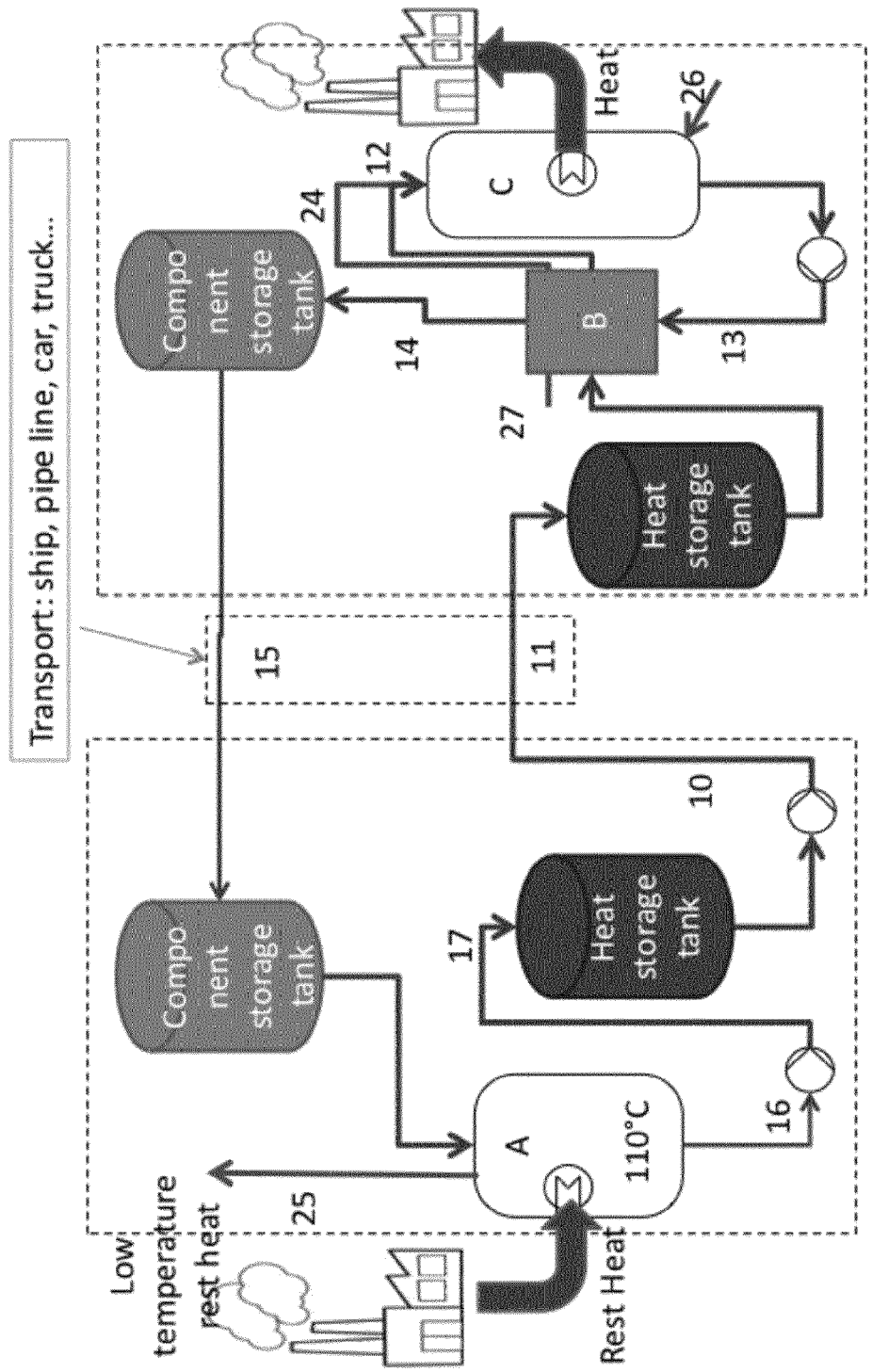
Figure 12:
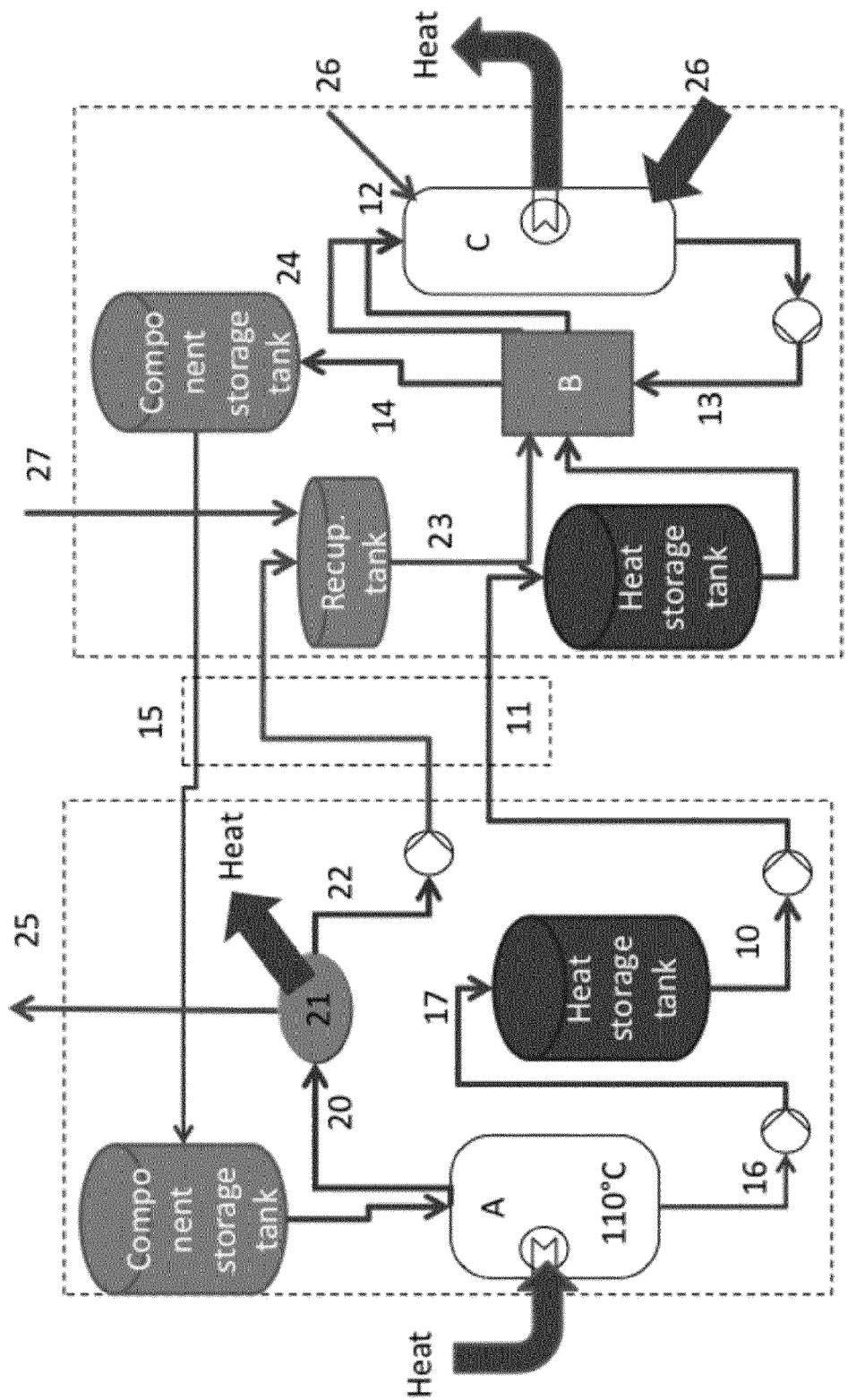
FIG. 12: General flow diagram for the reoccurring elements in the practical exploitation of the CHEMENERGY cycle. The storage tanks, both the heat storage tank(s) and the component storage tank(s), are optional.

Application 3 (FIG. 10): in buffering heat or energy (rest heat, solar heat, wind energy, steam, etc . . . ) with a heat storage tank. In this application rest heat from processes, sun, wind and others is used to pump up and store heat. This can e.g. be used for connecting a discontinuous heat producer to a continuous heat consumer, vice versa or to link discontinuous heat production with discontinuous heat consumption;

Application 4 (FIG. 11): in heat transport, that differs from the foregoing in that the rest heat is indeed converted and captured in a transportable form enabling on the one hand transport of 'rest heat' by bulk ship, containers, trucks, pipelines to another place of river, docks, canal, town, industrial or residential area . . . to a heat consumer(s) or its network, and on the other hand enabling the conversion of rest heat of transport media its engine, like e.g. motor heat of car, bus, boat, truck and others, transported and valorized at certain locations like e.g. at home, at work . . . ; or combinations thereof (Application 10).

Where the foregoing may create the impression that continuous or discontinuous operation of the CHEMENERGY cycle is dependent on the absence or presence of buffer tanks, in the foregoing applications it only refers to a continuous or discontinuous energy conversion. Whether or not tanks are used to buffer reaction solutions all processes 1-9 can be operated continuously or discontinuously. Consequently, in the general flow diagram (FIG. 12) representing the reoccurring flow in each of the foregoing applications, the storage tanks are optional.

Details on the elements in the flow diagrams for each of the foregoing applications can be found in Table 3 below.

| | | Application | | | | |
|---|---|---|---|---|---|---|
| Stream number | Description | General use as heat pump 1 | Heat pump between networks 2 | Heat buffering with storage tank 3 | Heat transport 4 | Heat pump to generate cold 5 |
| 1 | Classical solar hot water system | | | | | |
| 10 | polymerised or dehydrolysed product | x | x | x | x | x |
| 10b | polymerised or dehydrolysed product | | | | | |

| | | | | | | | |
|---|---|---|---|---|---|---|---|
| | from solar reactor cell | | | | | |
| 11 | Pressurised polymerised or dehydrolysed product | x | x | x | x | x |
| 12 | polymerised or dehydrolysed product heated with outlet of C | x | x | x | x | x |
| 13 | warm pressurised hydrolysed or depolymerised product | x | x | x | x | x |
| 14 | cooled pressurised hydrolysed or depolymerised product | x | x | x | x | x |
| 14b | dehydrolysed product towards solar reactor cell | | | | | |
| 15 | cooled pressurised hydrolysed or depolymerised product from tank | | | | x | x |
| 16 | fresh polymerised or dehydrolysed product | | | | x | x |
| 17 | fresh polymerised or dehydrolysed product pressurised for transport to storage tank | | | | x | x |
| 20 | water vapor from reactor section | x | x | x | | x |
| 20b | water vapor from solar reactor cell | | | | | |
| 21 | condensor partially/complete | 4.5 | 19 | 1 | | 1 |
| 22 | Condensate | x | x | x | | x |
| 23 | Condensate pressurised | x | x | x | | |
| 24 | Condensate heated with oulet of C | x | x | x | x | |
| 25 | Vapor release vacuum or pressurised/Spill | 1 | 1 | 30 | 31 | |
| 26 | Extra steam injection in reactor to boost temperature and heat power | 1 | 1 | 0 | x | |
| 27 | Extra condensate | x | x | x | x | |
| 28 | Expanded condensate at low vacuum, i.e. vapor | | | | | x |
| 29 | Condensed vapor at vacuum | | | | | x |
| 30 | heated media for heat customer (or net) respectively cold customer | x | x | | | x |
| 31 | pressurised heat product (or net) | x | x | | | |
| 32 | Heat/electric usage from customer | 5 | 23 | 33 | 33 | 1 |
| 33 | cooled product from heat customer | x | x | | | |
| 34 | fresh condensate from net | | x | | | |
| 35 | pressurised fresh condensate | | x | | | |
| 36 | condensate from reaction section | | x | | | |
| 37 | Low pressure steam | | x | | | |
| 38 | condesate feed to low pressure steam production | | x | | | |
| 39 | Back up high pressure steam | | | | | |
| 40 | vapor from ORC | | | | | |
| 42 | Expansion turbine ORC | | | | | |
| 43 | Cooled vapor after expansion turbinen ORC | | | | | |
| 44 | Condensed ORC medium | | | | | |
| 45 | Pressurised liquid ORC Medium | | | | | |
| A | Polymerisation Reactor section | 10 | 42 | 64 | 67 | 2 |
| B | Plate Heat exchanger | 3 | 12 | 18 | 16 | 0.5 |
| C | Hydrolysation reaction section | 5.5 | 24 | 36 | 36 | 1 |
| D | Expansion turbine Electric Power | | | | | |
| | Electric consumption | 55 | 240 | 360 | 360 | 10 |
| COP | Heat to customer (MW)/Electricity (MW) | 91 | 96 | 92 | 92 | 100 |
| Efficiency | Electricity/Heat | | | | | |
| Note1 | Recuperation of catalyst and other side streams not depicted on process flow diagram but on P&ID. | | | | | |
| Note2 | No valves, details depicted on PFD | | | | | |
| Note3 | Heat toss from storage and transport neglected for PFD | | | | | |

| | | Application | | | | | |
|---|---|---|---|---|---|---|---|
| Stream number | | Transforming restheat towards electricity 6 | Rest heat with PP and ORC towards electricity 7 | Transforming solar heat towards electricity 8 | Transforming wind energy into heat and viceversa 9 | Hybrid application 10 | Units |
| 1 | | | | x | | x | |
| 10 | | x | x | x | x | x | |
| 10b | | | | x | | x | |
| 11 | | x | x | | x | x | |
| 12 | | x | x | | x | x | |
| 13 | | x | x | | x | x | |
| 14 | | x | x | | x | x | |
| 14b | | | | x | | x | |

-continued

| | | | | | | |
|---|---|---|---|---|---|---|
| 15 | | | | | x | |
| 16 | | | | | x | |
| 17 | | | | | x | |
| 20 | x | x | x | x | x | |
| 20b | | x | | | x | |
| 21 | x | | x | x | x | MW |
| 22 | x | x | x | x | x | |
| 23 | x | x | x | x | x | |
| 24 | x | x | x | x | x | |
| 25 | x | 4 | x | x | x | MW |
| 26 | x | 0 | x | x | x | MW |
| 27 | x | x | x | x | x | |
| 28 | | | | | x | |
| 29 | | | | | x | |
| 30 | x | x | x | x | x | MW |
| 31 | | | | | x | |
| 32 | 2.3 | 2.3 | 0.1 | x | x | MW |
| 33 | xx | xx | xx | xx | x | |
| 34 | x | | x | x | x | |
| 35 | x | | x | x | x | |
| 36 | x | | x | x | x | |
| 37 | x | | x | x | x | |
| 38 | x | | x | x | x | |
| 39 | x | | x | x | x | |
| 40 | | x | | | x | |
| 42 | | x | | | x | |
| 43 | | x | | | x | |
| 44 | | x | | | x | |
| 45 | | x | | | x | |
| A | 42 | 10 | 1 | 55 | | MW |
| B | 12 | 3 | 0.3 | 20 | | MW |
| C | 24 | 6 | 0.6 | 30 | | MW |
| D | 2.3 | 2.3 | 0.1 | 3 | | MW |
| | 240 | 57.1 | 6 | 10000 | | kW |
| COP | | | | — | | % |
| Efficiency | 5% | 23% | 11% | | | |
| Note1 | | | | | | |
| Note2 | | | | | | |
| Note3 | | | | | | |

Depending on the applications, the cycle can be build from small e.g. domestic application to a big industrial scale.

on skids, small scale big scale.

in containers or other movable platforms.

In each of the possible applications the cycle can be controlled with simple temperature, pressure, flow or other sensors regulating valves and systems, or designed from something between simple electrical & instrumentation design and/or highly sophisticated electrical instrumentation design, fully automated installations with optimizer connected to internet, mobile phone or others to run on maximum economical output 24 h a day. Optimizer might run on demand, ambient temperature, wind or other circumstance determining the economics or performance of the installation.

Based on industry standardized safety reviews, like e.g. HAZOP, Installations are designed to high safety standards containing whether intrinsic safe design (like e.g. vacuum and maximum operating pressure+10%), pressure valves, or automated safety integrity function (SIF or SIL) systems or a combination of these design criteria. Installations are controlled with alarms and trips in order to keep the installation in the safe operating range. Basic design of equipment depends on the process design but the detailed equipment design can be different in order to meet PED, ASME or other local design codes or local state of the art technology.

The invention claimed is:

1. A method to store or increase the energy content of a reaction mixture by heating a reaction mixture comprising an inorganic oxoacid compound and/or its salt and water to cause an endothermic condensation reaction using heat from a heat source distinct from said reaction mixture.

2. The method according to claim 1, wherein the heat source distinct from said reaction mixture is selected from rest heat from industrial processes or heat derived from natural resources.

3. The method according to claim 1, wherein water and/or the inorganic oxoacid compound and/or its salt is removed from the reaction mixture.

4. The method according to claim 1, further comprising releasing the stored increased energy content of the reaction mixture through the exothermic hydrolysation of the reaction products of said reaction mixture.

5. The method according to claim 1, wherein the inorganic oxoacid compound and/or its salt is an oxoacid of either nitrogen, sulfur or phosphorus, or its corresponding salt.

6. The method according to claim 5, wherein the inorganic oxoacid compound and/or its salt is represented by general formula (I)

$$R-O_p-((O_nX(OQ)_m-O)_y)-R' \qquad (I)$$

wherein;

R represents hydrogen, a hydrocarbon or Z;

X represents sulfur, nitrogen or phosphorus;

Z represents $-(O_nX(OQ)_m-O)_y-R''$;

R' and R" each independently represent hydrogen, a hydrocarbon or a metal cation;

n=1 or 2; m=0 or 1; p=0 or 1; y=at least 1; and

Q each independently represent hydrogen, hydrocarbon or a metal cation.

7. The method according to claim 6, wherein the inorganic oxoacid compound and/or its salt are polyphosphoric acids and/or their salts, represented by general formula (Ia)

$$R\text{—}O\text{-}((OP(OQ)_m\text{-}O)_y\text{-}R' \quad (Ia)$$

wherein
R and R' each independently represent hydrogen, a hydrocarbon or a metal cation;
m=0 or 1; y=at least 1; and
each Q represents hydrogen, hydrocarbon or a metal cation.

8. The method according to claim 7, wherein the polyphosphoric acids or their salts are:
   a. pure inorganic linear polyphosphoric acids or their salts represented by the following formula:

$$M_{n+2}P_nO_{(3n+1)} \quad (Ib)$$

with n=at least 2; M is H+ or a metal cation;
   b. pure inorganic cyclic polyphosphoric acids or their salts represented by the following formula:

$$M_nP_nO_{3n} \quad (Ic)$$

with n=at least 3; M is H+ or a metal cation;
   c. branched; or
   d. combinations thereof.

9. The method according to claim 6, wherein the metal cation is a monovalent metal cation.

10. The method according to claim 6, wherein y is within the range of 1 to 100.

11. The method according to claim 7 wherein the salts of phosphoric acids are selected from the group consisting of Phosphoenolpyruvate, Glyceratel,3 bi phosphate, Formyl phosphate, Acetyl phosphate, Propionyl phosphate, Butyryl phosphate or other carboxyl phosphates, Phospho-creatine, Phospho-arginine, Glucose phosphates (1 or 6-phosphate), fructose phosphates, Glycerol-3-phosphate, Nicotine amide adenine dinucleotide phosphate (NADP), dihydroxyacetone-phosphate, glyceraldehydephosphates, xylulosephosphate, ribosephosphates, sedoheptulosephosphate, Erythrosephosphate, ribuloseophosphate phospho-serine, Aspartylphosphate and adenosinephosphate.

12. The method according to claim 1, wherein the endothermic condensation reaction is represented by the following formula:

$$HOXO_n(OH)_mOR'+R\text{—}O_p\text{—}((XO_n(OH)_m\text{-}O)_{y-1})\text{-}H \rightarrow R\text{—}Op\text{—}((XO_n(OH)_m\text{-}O)_y)\text{-}R'+H_2O$$

13. The method according to claim 12, wherein X is phosphorus.

14. A system for capturing or storing energy comprising:
    means for capturing energy;
    means for storing captured energy, wherein the capture and storage means comprise at least one reaction vessel at least partially filled with a
    reaction mixture comprising an inorganic oxoacid compound and/or its salt and water suitable for having an endothermic condensation reaction performed on said reaction mixture, and comprising a heating element in thermal communication with said vessel.

15. The system according to claim 14, further comprising means for releasing the energy captured and stored by exothermic hydrolysis.

16. The system according to claim 14, wherein the reaction mixture comprises an inorganic oxoacid compound and/or its salt.

* * * * *

UNITED STATES PATENT AND TRADEMARK OFFICE
CERTIFICATE OF CORRECTION

PATENT NO. : 9,163,868 B2
APPLICATION NO. : 13/981683
DATED : October 20, 2015
INVENTOR(S) : Ducheyne et al.

It is certified that error appears in the above-identified patent and that said Letters Patent is hereby corrected as shown below:

On the title page

(75)　Inventors:　"Wouter Ducheyne, Antwerp (BE);
　　　　　　　　　Christian Stevens, Ghent (BE)"

should read

(75)　Inventors:　--Wouter Ducheyne, Antwerpen (BE);
　　　　　　　　　Christian Stevens, Ghent (BE)--;

(73)　Assignees:　"Technology for Renewable Energy
　　　　　　　　　Systems (TFRES) BVBA, Antwerp
　　　　　　　　　(BE); Universiteit Gent, Ghent (BE)"

should read

(73)　Assignees:　--Technology for Renewable Energy
　　　　　　　　　Systems (TFRES) BVBA, Antwerpen
　　　　　　　　　(BE); Universiteit Gent, Ghent (BE)--;

In the specification

Col. 1, Line 57,
　　"Materials using there phase change as a means to store or" should read
　　--Materials using their phase change as a means to store or--;

Signed and Sealed this
Seventh Day of June, 2016

Michelle K. Lee
*Director of the United States Patent and Trademark Office*

CERTIFICATE OF CORRECTION (continued)
U.S. Pat. No. 9,163,868 B2

In the specification

Col. 2, Line 2,
"more easiness then nowadays: waste heat. Lots of waste heat" should read
--more easiness than nowadays: waste heat. Lots of waste heat--;

Col. 2, Line 37,
"or to increase the thermal energy of a heat sources, with very" should read
--or to increase the thermal energy of a heat source, with very--;

Col. 2, Line 48,
"Pat. No. 6,177,02581, and JP01161082 this process is fur-" should read
--Pat. No. 6,177,025 B1, and JP01161082 this process is fur- --;

Col. 2, Lines 61-62,
"Kazuo; Heat accumulating material. In this patent the a sodium phosphate; Na2HPO4 is used to store heat by" should read
--Kazuo; Heat accumulating material. In this patent the sodium phosphate; $Na_2HPO_4$ is used to store heat by--;

Col. 3, Line 1,
"E. Using dissolution heat such as after bringing after bringing" should read
--E. Using dissolution heat such as after bringing--;

Col. 3, Line 21,
"application of salt hydrates, like e.g. MgCl2, Mg(OH)2Ca" should read
--application of salt hydrates, like e.g. $MgCl_2$, $Mg(OH)_2Ca$--;

Col. 3, Line 37,
"energy density, may simply use this compounds as an" should read
--energy density, may simply use these compounds as an--;

Col. 4, Line 27,
"the thermal energy of the heat source is stored by means an" should read
--the thermal energy of the heat source is stored by means of a--;

Col. 5, Line 30,
"represented by the following formula: $M_{n+2}P_nO_{(3n+1)}$" should read
--represented by the following formula: $M_{n+2}P_nO_{(3n+1)}$--;

Col. 6, Line 48,
"represented by the following formula: $M_{n+2}P_nO_{(3n+1)}$" should read
--represented by the following formula: $M_{n+2}P_nO_{(3n+1)}$--;

CERTIFICATE OF CORRECTION (continued)
U.S. Pat. No. 9,163,868 B2

In the specification

Col. 6, Line 51,
"represented by the following formula: $M_nP_nO_{3n}(IC)$" should read
--represented by the following formula: $M_nP_nO_{3n}(Ic)$--;

Col. 9, Line 15,
"can consist out of any combination of different nucleotides." should read
--can consist of any combination of different nucleotides.--;

Col. 10, Line 4,
"$M_nP_nO_{3n}(IC)$" should read
--$M_nP_nO_{3n}(Ic)$--;

Col. 10, Line 45,
"ous heat stream can stored/transported at ambient circum-" should read
--ous heat stream can be stored/transported at ambient circum- --;

Col. 17, Line 5,
"among others pH, ion concentration Ca2+, Mg2+, K," should read
--among others pH, ion concentration $Ca^{2+}$, $Mg^{2+}$, K,--;

Col. 17, Line 46,
"among others pH, ion concentration Ca2+, Mg2+, K," should read
--among others pH, ion concentration $Ca^{2+}$, $Mg^{2+}$, K,--;

Col. 18, Line 31,
"phates of the in this invention described components can" should read
--phates of the described components can--;

Col. 18, Line 55,
"Many of the used materials have routes being filed by e.g." should read
--Many of the used materials have routes being filled by e.g.--;

Col. 18, Line 66,
"preferably chemically pure quality, typically 700-85%" should read
--preferably chemically pure quality, typically 70-85%--;

Col. 19, Line 40,
"Reaction Heat=(Mass)×($Cp$)×(Delta $T$)" should read
--Reaction Heat=(Mass)×($Cp$)×(Delta T)--;

Col. 19, Line 66,
"motor is about 90° C. Steps 1-4 were tested times after each" should read
--motor is about 90° C. Steps 1-4 were tested 10 times after each--;

CERTIFICATE OF CORRECTION (continued)

In the specification

Col. 20, Line 24,
"other fluida, and/or heat sources, the present cycle allows the" should read
--other fluids, and/or heat sources, the present cycle allows the--;

Col. 20, Line 40,
"i.e. in other words to drive the polymerization condensation)" should read
--i.e. in other words to drive the polymerization (condensation)--;

Col. 20, Line 42,
"energy of the condensed polymerized) components (10) used" should read
--energy of the condensed (polymerized) components (10) used--;

Col. 20, Line 57,
"0.5 barg, but sometimes higher in function of specific opera-" should read
--0.5 bar, but sometimes higher in function of specific opera- --;

Col. 22, Line 15,
"solid P2O5 is left." should read
--solid $P_2O_5$ is left.--;

Col. 22, Table 3,
38
"condesate feed to low pressure" should read
--condensate feed to low pressure--;
43
"Cooled vapor after expansion turbinen ORC" should read
--Cooled vapor after expansion turbine ORC--;
Note 3
"Heat toss from storage and transport neglected" should read
--Heat loss from storage and transport neglected--;

Col. 25, Line 37,
"Depending on the applications, the cycle can be build" should read
--Depending on the applications, the cycle can be built--;

In the claims

Col. 26, Claim 6, Line 26,
"Z represents –(OnX(OQ)$_m$-0)$_y$-R'" should read
--Z represents –(O$_n$X(OQ)$_m$-0)$_y$-R"--;

CERTIFICATE OF CORRECTION (continued)
U.S. Pat. No. 9,163,868 B2

In the claims

Col. 27, Claim 8, Line 16,
"$M_{n+2}PnO_{(3n+i)}$ (Ib)" should read
--$M_{n+2}P_nO_{(3n+1)}$ (Ib)--; and Col. 28, Claim 12, Line 13,
"H→R-Op-$((XO_n(OH)_m-0)_y)$-R'+$H_20$" should read
--H→R-$O_p$-$((XO_n(OH)_m-0)_y)$-R'+$H_2O$--.